US011141893B2

(12) United States Patent
Suzuki et al.

(10) Patent No.: US 11,141,893 B2
(45) Date of Patent: Oct. 12, 2021

(54) INTEGRALLY MOLDED BODY AND METHOD FOR PRODUCING THE SAME

(71) Applicant: Toray Industries, Inc., Tokyo (JP)

(72) Inventors: Takafumi Suzuki, Ehime (JP); Yuichiro Sento, Ehime (JP); Naokichi Imai, Ehime (JP); Mitsushige Hamaguchi, Nagoya (JP); Masato Honma, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 15 days.

(21) Appl. No.: 16/641,436

(22) PCT Filed: Aug. 24, 2018

(86) PCT No.: PCT/JP2018/031343
§ 371 (c)(1),
(2) Date: Feb. 24, 2020

(87) PCT Pub. No.: WO2019/044694
PCT Pub. Date: Mar. 7, 2019

(65) Prior Publication Data
US 2020/0198194 A1     Jun. 25, 2020

(30) Foreign Application Priority Data

Aug. 31, 2017  (JP) .............................. JP2017-166843
Aug. 31, 2017  (JP) .............................. JP2017-166844

(51) Int. Cl.
*B29C 45/14* (2006.01)
*B32B 5/28* (2006.01)
(Continued)

(52) U.S. Cl.
CPC ................ *B29C 45/14* (2013.01); *B32B 5/28* (2013.01); *B29K 2705/02* (2013.01);
(Continued)

(58) Field of Classification Search
CPC .................................. B29C 45/14; B32B 5/28
(Continued)

(56) References Cited

U.S. PATENT DOCUMENTS

| 2001/0053451 | A1  | 12/2001 | Togawa et al. |
| 2011/0143110 | A1* | 6/2011  | Tsuchiya ................. B29C 70/08 |
|              |     |         | 428/213 |
| 2016/0251498 | A1* | 9/2016  | Imai ........................ B29C 70/14 |
|              |     |         | 524/114 |

FOREIGN PATENT DOCUMENTS

| JP | 60260313 A | 12/1985 |
| JP | 09272134 A | 10/1997 |

(Continued)

OTHER PUBLICATIONS

Fedors, R., "A Method for Estimating Both the Solubility Parameters and Molar Volumes of Liquids", Polymer Engineering and Science, Feb. 1974, vol. 14, No. 2, pp. 147-154.
(Continued)

*Primary Examiner* — Tahseen Khan
(74) *Attorney, Agent, or Firm* — RatnerPrestia

(57) ABSTRACT

In order to solve reduction in strength and rigidity at a weldline which is a problem of an injection molding body, and enable free design such as thin wall molding or complex shape molding of the injection molding body, there is provided an integrally molded body in which a substrate for reinforcement (a) having a discontinuous fiber (a1) and a resin (a2) and an injection molding body (b) having a discontinuous fiber (b1) and a resin (b2) are integrated, in which the substrate for reinforcement (a) has a difference in an orientation angle of the discontinuous fiber (a1) in each of regions obtained by dividing a major axis direction of the substrate for reinforcement (a) into 10 equal parts of within 10°, and the substrate for reinforcement (a) covers a part or
(Continued)

all of a weldline of the injection molding body (b) to be integrated with the injection molding body (b).

16 Claims, 5 Drawing Sheets

(51) Int. Cl.
  *B29K 705/02* (2006.01)
  *B32B 27/08* (2006.01)
(52) U.S. Cl.
  CPC ......... *B32B 27/08* (2013.01); *B32B 2260/046* (2013.01); *B32B 2262/101* (2013.01); *B32B 2262/106* (2013.01)
(58) Field of Classification Search
  USPC ........................................................ 428/220
  See application file for complete search history.

(56) References Cited

FOREIGN PATENT DOCUMENTS

| | | |
|---|---|---|
| JP | 2000167863 A | 6/2000 |
| JP | 2001341216 A | 12/2001 |
| JP | 2004082470 A | 3/2004 |
| JP | 2010253938 A | 11/2010 |
| WO | 2016006614 A1 | 1/2016 |

OTHER PUBLICATIONS

International Search Report and Written Opinion for International Application PCT/JP2018/031343, dated Nov. 6, 2018, 6 pages.
Chinese Office Action for Chinese Application No. 201880046782.9, dated Apr. 6, 2021, with translation, 12 pages.

\* cited by examiner

Fig. 3
(a)
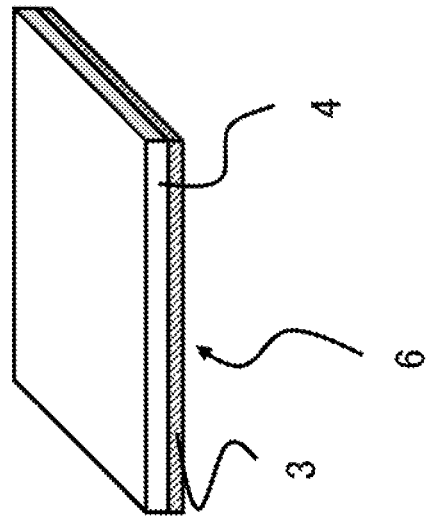
(b)
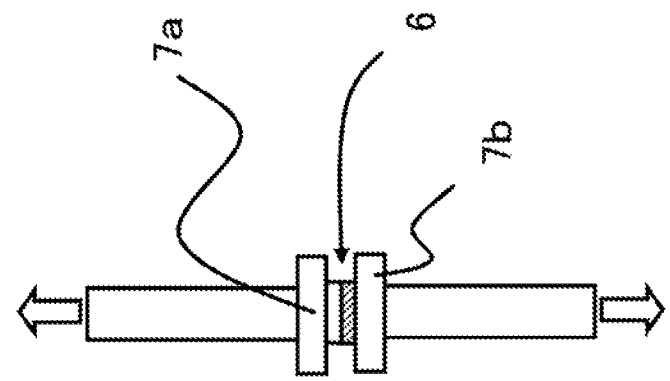

INTEGRALLY MOLDED BODY AND METHOD FOR PRODUCING THE SAME

CROSS REFERENCE TO RELATED APPLICATIONS

This is the U.S. National Phase application of PCT/JP2018/031343, filed Aug. 24, 2018, which claims priority to Japanese Patent Application No. 2017-166843, filed Aug. 31, 2017, and Japanese Patent Application No. 2017-166844, filed Aug. 31, 2017, the disclosures of each of these applications being incorporated herein by reference in their entireties for all purposes.

FIELD OF THE INVENTION

The present invention relates to an integrally molded body in which a substrate for reinforcement and an injection molding body are integrated, and a method for producing the same.

BACKGROUND OF THE INVENTION

Injection molding is a molding method excellent in moldability, productivity, and economic efficiency, and is frequently used for preparing automotive equipment parts, and parts and housings of electrical and electronic equipment such as personal computers, OA equipment, AV equipment, mobile phones, telephones, facsimiles, home appliances, and toy products. In recent years, with the spread of portable electronic devices typified by laptops, mobile phones, and portable information terminals, injection molding bodies are required to be thinner, complex shapes, and high strength and rigidity.

However, the injection molding body has a problem of reduction in strength and rigidity at a weldline. The weldline refers to a part where a molten resin for injection molding flowing in a mold joins and is welded, and is generated in an injection molding mold, when there are a plurality of gates, or when there are pins, bosses, ribs and the like in a mold cavity.

In particular, when producing a thin-walled or complex-shaped injection molding body, there are many cases where there are a plurality of gates or there are pins, bosses, ribs and the like in the mold cavity, and there are a plurality of generated weldlines, thus the reduction in strength and rigidity at the weldlines is a major problem.

In addition, the resin for injection molding is sometimes filled with reinforcement fibers for the purpose of increasing strength and rigidity, but it has been known that, at the weldline, the fiber orientation of the reinforcement fibers is perpendicular to the flow direction of the resin for injection molding. Therefore, the reinforcing effect by the reinforcement fibers is hardly obtained at the weldline, and the strength and rigidity of the weldline are remarkably low as compared to the strength and rigidity of portions other than the weldline. Due to the reduction in strength and rigidity of the weldline, the strength and rigidity of the injection molding body are also greatly reduced.

In order to prepare a high-strength, high-rigidity injection molding body, a technique for reinforcing a weldline has been known.

Patent Document 1 describes a method of reinforcing a weldline by inserting a thermoplastic resin film or sheet into an injection molding mold.

Patent Document 2 describes a method of reinforcing a weldline by inserting a continuous fiber reinforced thermoplastic resin composite material into an injection molding mold.

Patent Document 3 describes a method of reinforcing a weldline by inserting a thermoplastic resin sheet containing continuous reinforcement fibers arranged in one direction or a sheet formed by piling up the sheets into a mold.

Patent Document 4 describes an integrally molded body in which a discontinuous fiber substrate larger than an injection molding mold cavity is inserted and bosses, ribs and the like are molded by injection molding, in order to solve anisotropy of the injection molding body.

PATENT DOCUMENTS

Patent Document 1: Japanese Patent Laid-open Publication No. S60-260313
Patent Document 2: Japanese Patent Laid-open Publication No. 2000-167863
Patent Document 3: Japanese Patent Laid-open Publication No. H09-272134
Patent Document 4: Japanese Patent Laid-open Publication No. 2010-253938

SUMMARY OF THE INVENTION

In the invention described in Patent Document 1, the thermoplastic resin film or sheet did not contain fibers, and the reinforcement of weldlines only by this did not provide a sufficient reinforcing effect, and the strength and rigidity as an injection molding body were insufficient. In addition, when only a thermoplastic resin film or sheet was inserted into an injection molding mold, the thermoplastic resin film or sheet melts and flows during injection molding, whereby it was considered difficult to ensure thickness uniformity.

In the invention described in Patent Document 2, since a plain weave fabric of continuous fibers is used as a substrate for reinforcement of weldlines, anisotropy exists in the characteristics of the substrate. Therefore, it is necessary to consider the direction of the substrate for reinforcement with respect to the weldline, and the design is limited. In addition, when the weldlines are present in multiple directions, application to the respective weldlines is difficult. Furthermore, since the substrate for reinforcement is made of continuous fibers, a large difference occurs in the mechanical characteristics with the injection molding body. Therefore, when a load is applied to the integrally molded body, stress concentrates on a bonding surface between the substrate for reinforcement and the injection molding body or the end of the substrate for reinforcement. Therefore, the stress concentration part becomes a breaking point, and the strength of the integrally molded body is reduced. Moreover, when a substrate for reinforcement made of a thermoplastic resin is inserted into an injection molding mold, a part of the thermoplastic resin melts and flows, whereby it is difficult to ensure thickness uniformity. Further, the substrate for reinforcement might be buried in the resin for injection molding.

In the invention described in Patent Document 3, since the continuous fibers arranged in one direction are contained in the thermoplastic resin sheet as described above, anisotropy exists in the characteristics of the substrate. Therefore, it is necessary to consider the direction of the substrate for reinforcement with respect to the weldline, and the design is limited. In addition, when the weldlines are present in multiple directions, application to the respective weldlines is difficult. It is also possible to pile up the substrate into a quasi-isotropic substrate, but increasing the number of layers increases the thickness of the substrate for reinforcement, and the resin for injection molding becomes unfilled during thin wall molding or complex shape molding, thus it is considered difficult to obtain an integrally molded body. Furthermore, since the substrate for reinforcement is made of continuous fibers, a difference occurs in mechanical characteristics with the injection molding body. Therefore, when a load is applied to the integrally molded body, stress concentrates on a bonding surface between the substrate for reinforcement and the injection molding body or the end of the substrate for reinforcement. Therefore, the stress concentration part becomes a breaking point, and the strength of the integrally molded body is reduced. Further, when the resin on the surface of the substrate for reinforcement is cooled after being melted, deformation of the substrate for reinforcement is caused due to the fibers arranged in one direction, thus it is considered difficult to ensure thickness uniformity.

In the invention described in Patent Document 4, since the thermoplastic resin is injected in a state where the thick discontinuous fiber substrate is disposed on an entire surface inside the cavity, fluidity of the resin is lowered. For this reason, it is considered difficult to mold a complicated shape. Increasing the injection speed and injection pressure may make it possible to mold a molded body with a complex shape. However, the pressure of the resin for injection molding tends to cause deformation of the substrate for reinforcement at the time of integration, thus it is considered difficult to ensure thickness uniformity.

An object of the present invention is to solve the reduction in strength and rigidity at a weldline which is a problem of an injection molding body, and provide a molded body applicable to thin wall molding or complex shape molding.

The present invention according to exemplary embodiments for solving the above-described problems mainly has one of the following configurations.

(1) An integrally molded body in which a substrate for reinforcement (a) having a discontinuous fiber (a1) and a resin (a2) and an injection molding body (b) having a discontinuous fiber (b1) and a resin (b2) are integrated, the substrate for reinforcement (a) having a difference in an orientation angle of the discontinuous fiber (a1) in each of regions obtained by dividing a major axis direction of the substrate for reinforcement (a) into 10 equal parts of within 10°, the substrate for reinforcement (a) covering a part or all of a weldline of the injection molding body (b) to be integrated with the injection molding body (b).

(2) An integrally molded body in which a substrate for reinforcement (a) having a discontinuous fiber (a1) and a resin (a2) and an injection molding body (b) having a discontinuous fiber (b1) and a resin (b2) are integrated, a bonding strength between the substrate for reinforcement (a) and the injection molding body (b) being 7 MPa or more, a thickness variation of the substrate for reinforcement (a) in the integrally molded body being within 10%, the substrate for reinforcement (a) covering a part or all of a weldline of the injection molding body (b) to be integrated with the injection molding body (b).

(3) A method for producing an integrally molded body including arranging a substrate for reinforcement (a) having a discontinuous fiber (a1) and a resin (a2) in a mold and integrating the substrate for reinforcement (a) with a weldline of an injection molding body (b) having a discontinuous fiber (b1) and a resin (b2), the substrate for reinforcement (a) having a difference in an orientation angle of the discontinuous fiber (a1) in each of regions obtained by dividing a length direction of the substrate for reinforcement (a) when arranged in the mold into 10 equal parts of within 10°.

(4) A method for producing an integrally molded body including integrating a substrate for reinforcement (a) having a discontinuous fiber (a1) and a resin (a2) with a weldline of an injection molding body (b) having a discontinuous fiber (b1) and a resin (b2), the substrate for reinforcement (a) having a difference in an orientation angle of the discontinuous fiber (a1) in each of regions obtained by dividing a length direction of the substrate for reinforcement (a) when laying up the substrate for reinforcement (a) on the injection molding body (b) into 10 equal parts of within 10°.

According to the present invention, in a reinforcement of weldlines of an injection molding body, it is possible to reinforce the weldlines and obtain a thin-walled or complex-shaped integrally molded body having excellent bonding strength, without considering an arrangement direction of the substrate for reinforcement with respect to the weldline, and also without causing fiber disturbance of the substrate for reinforcement during integral molding. Moreover, according to the present invention, a substrate for reinforcement can be accurately and closely stuck to a mold surface during integral molding. Therefore, it is possible to reinforce the weldline while preventing the substrate for reinforcement from shifting from the lay-up position and being buried in the resin for injection molding at the time of integration with the resin for injection molding, and produce a thin-walled or complex-shaped integrally molded body with high productivity, without fiber disturbance in the substrate for reinforcement.

BRIEF DESCRIPTION OF DRAWINGS

FIG. 3 is a schematic diagram of a test piece and a tensile jig for evaluation of bonding strength.

DETAILED DESCRIPTION OF EMBODIMENTS OF THE INVENTION

Figure 1:
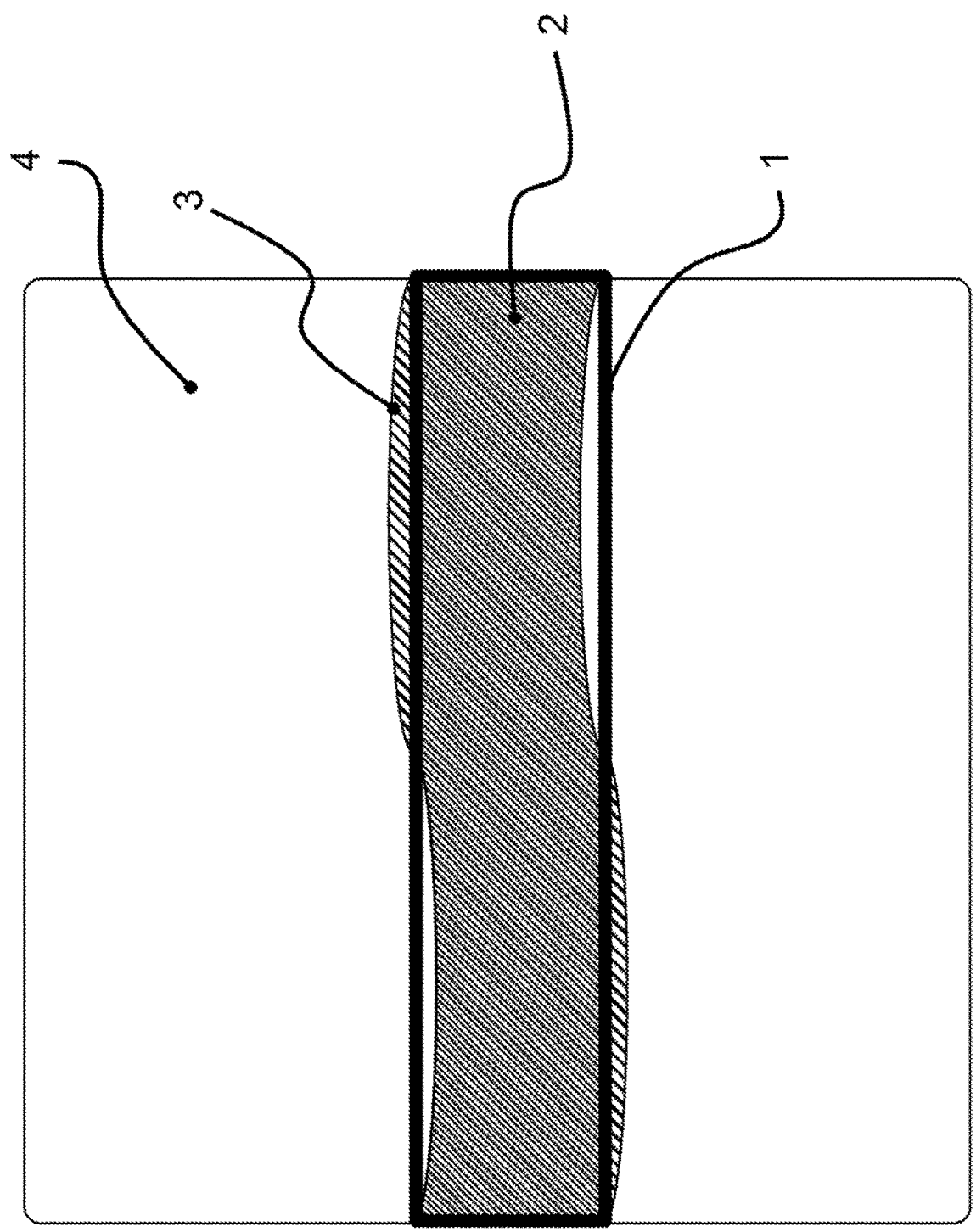
FIG. 1 is a schematic diagram showing an area of a substrate for reinforcement and an area in which a substrate for reinforcement is first inserted in an integrally molded body in which a weldline of an injection molding body is reinforced.

The integrally molded body according to embodiments of the present invention is formed by integrating a substrate for reinforcement (a) having a discontinuous fiber (a1) and a resin (a2) with an injection molding body (b) having a discontinuous fiber (b1) and a resin (b2) so as to cover a part or all of the weldline of the injection molding body. Here, the term "cover" refers that the substrate for reinforcement (a) covers the weldline over the width direction of the weldline of the injection molding body (b), and the term "a part or all" of the weldline refers a part or all of the length direction.

Hereinafter, preferred embodiments of the present invention will be described.

The discontinuous fiber (a1) in the present invention are not particularly limited, and for example, carbon fibers, glass fibers, aramid fibers, alumina fibers, silicon carbide fibers, boron fibers, metal fibers, natural fibers, mineral fibers, and the like can be used. These may be used alone or in combination of two or more. Among them, PAN-based, pitch-based, and rayon-based carbon fibers are suitably used from the viewpoint of high specific strength and specific rigidity and a weight reduction effect. Moreover, glass fibers can be suitably used from the viewpoint of increasing the economic efficiency of the integrally molded body to be obtained, carbon fibers and glass fibers are suitably used in combination from the viewpoint of a balance between mechanical characteristics and economic efficiency in particular. Furthermore, aramid fibers can be suitably used from the viewpoint of increasing the impact absorption and shaping properties of the integrally molded body to be obtained, carbon fibers and aramid fibers are suitably used in combination from the viewpoint of a balance between mechanical characteristics and impact absorption in particular.

Further, reinforcement fibers coated with metal such as nickel, copper or ytterbium can also be used from the viewpoint of increasing conductivity of the integrally molded body to be obtained. At the weldline in the injection molding body (b), the fiber orientation of the discontinuous fiber (b1) is perpendicular to a flow direction of the resin for injection molding, so that electromagnetic shielding properties at the weldline are lowered. From the viewpoint of electromagnetic shielding properties, the discontinuous fiber (a1) contained in the substrate for reinforcement (a) preferably exhibits conductivity.

The discontinuous fiber (a1) in the present invention are preferably surface-treated with a sizing agent from the viewpoint of improving mechanical characteristics. Examples of the sizing agent include polyfunctional epoxy resins, acrylic acid polymers, polyhydric alcohols, polyethyleneimines, and the like. Specific examples include polyglycidyl ethers of an aliphatic polyhydric alcohol such as glycerol triglycidyl ether, diglycerol polyglycidyl ether, polyglycerol polyglycidyl ether, sorbitol polyglycidyl ether, arabitol polyglycidyl ether, trimethylolpropane triglycidyl ether and pentaerythritol polyglycidyl ether, polyacrylic acid, copolymers of acrylic acid and methacrylic acid, copolymers of acrylic acid and maleic acid or a mixture of two or more thereof, polyvinyl alcohol, glycerol, diglycerol, polyglycerol, sorbitol, arabitol, trimethylolpropane, pentaerythritol, polyethyleneimine containing more amino groups in one molecule, and the like. Among them, glycerol triglycidyl ether, diglycerol polyglycidyl ether and polyglycerol polyglycidyl ether are preferably used in the present invention since they contain many highly reactive epoxy groups in one molecule, have high water solubility, and are easy to apply to the discontinuous fiber (a1). The sizing agent is preferably contained in an amount of 0.01 to 5 parts by mass, and more preferably 0.1 to 2 parts by mass with respect to 100 parts by mass of the discontinuous fiber (a1). Here, as a preferable range, it can also be set as a combination of either of the upper limits and either of the lower limits described above. In addition, the sizing agent may not be evenly applied to the discontinuous fiber (a1), and a portion that is selectively applied at a high concentration and a portion that is applied at a low concentration may be provided within the above preferable ranges.

Examples of a means for applying the sizing agent to the discontinuous fiber (a1) include a method of immersing the discontinuous fiber (a1) in a liquid containing the sizing agent via a roller, a method of spraying a sizing agent in mist form on the discontinuous fiber (a1), and the like. At this time, it is preferable to dilute the sizing agent with a solvent and control temperature at application, yarn tension and the like so that the amount of the sizing agent adhered to the discontinuous fiber (a1) becomes more uniform. Examples of the solvent for diluting the sizing agent include water, methanol, ethanol, dimethylformamide, dimethylacetamide, acetone and the like, and water is preferred from the viewpoint of easy handling in a production process and disaster prevention. Such a solvent is removed by applying the sizing agent to the discontinuous fiber (a1) and then evaporating by heating. Moreover, when using a compound insoluble or hardly soluble in water as the sizing agent, it is preferable to add an emulsifier or a surfactant and use the compound as an aqueous dispersion. As the emulsifier or surfactant, an anionic emulsifier, a cationic emulsifier, a nonionic emulsifier or the like can be used. Among them, it is preferable to use a nonionic emulsifier having little interaction because it is less likely to inhibit the effect of the sizing agent.

The fiber length of the discontinuous fiber (a1) is not particularly limited, but is preferably 1 to 50 mm and more preferably 3 to 30 mm, from the viewpoint of the mechanical characteristics and moldability of the substrate for reinforcement (a) and the integrated molded body. Here, as a preferable range, it can also be set as a combination of either of the upper limits and either of the lower limits described above. When the fiber length of the discontinuous fiber (a1) is 1 mm or more, the reinforcing effect by the discontinuous fiber (a1) can be efficiently exhibited. Further, when the fiber length is 50 mm or less, dispersion of the discontinuous fiber (a1) can be well maintained. Here, the fiber length may be uniform for all the discontinuous fiber (a1), but long fibers and short fibers may be mixed within the above preferred ranges.

As a method for measuring the fiber length of the discontinuous fiber (a1), for example, there is a method of dissolving only the resin of the substrate for reinforcement (a), filtering the remaining discontinuous fiber (a1), and measuring the fiber length by microscopic observation (dissolution method). When there is no solvent for dissolving the resin, there is a method of burning off only resin in the temperature range where oxidation loss of the discontinuous fiber (a1) does not occur, separating the discontinuous fiber (a1), and measuring the fiber length by microscopic observation (burn-off method), and the like. In the measurement, 400 discontinuous fibers (a1) are randomly selected, and the length is measured up to 1 µm units with an optical microscope, whereby the fiber length and its ratio can be measured.

The weight ratio of the discontinuous fiber (a1) in the substrate for reinforcement (a) is preferably 5 to 60% by mass, more preferably 10 to 50% by mass, and further preferably 15 to 40% by mass, with respect to 100% by mass of the substrate for reinforcement (a), from the viewpoint of achieving both mechanical characteristics and moldability. Here, as a preferable range, it can also be set as a combination of either of the upper limits and either of the lower limits described above.

The resin (a2) is not particularly limited, and for example, a thermoplastic resin is preferable. Specific examples thereof include thermoplastic resins selected from crystalline plastics such as "polyesters such as polyethylene terephthalate (PET), polybutylene terephthalate (PBT), polytrimethylene terephthalate (PTT), polyethylene naphthalate (PEN) and liquid crystal polyesters, polyolefins such as polyethylene (PE), polypropylene (PP) and polybutylene, polyoxymethylene (POM), polyamide (PA), polyarylene sulfides such as polyphenylene sulfide (PPS), polyketone (PK), polyether ketone (PEK), polyether ether ketone (PEEK), polyether ketone ketone (PEKK), polyether nitrile (PEN), and fluorine-based resins such as polytetrafluoroethylene", amorphous plastics such as "in addition to styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)", in addition, phenol-based resins, phenoxy resins, further, polystyrene-based, polyolefin-based, polyurethane-based, polyester-based, polyamide-based, polybutadiene-based, polyisoprene-based, and fluorine-based resins, acrylonitrile-based and other thermoplastic elastomers, copolymers and modified products thereof, and the like. Among them, polyolefin is preferred from the viewpoint of lightness of the integrally molded body to be obtained, and polyamide is preferred from the viewpoint of strength. Then, amorphous resins such as polycarbonate and styrene-based resins are suitably used from the viewpoint of surface appearance, polyarylene sulfides are suitably used from the viewpoint of heat resistance, polyether ether ketone is suitably used from the viewpoint of continuous use temperature, and further, fluorine-based resins are suitably used from the viewpoint of chemical resistance. Further, a thermosetting resin can also be used as the resin (a2), and examples of the thermosetting resin include thermosetting resins selected from unsaturated polyesters, vinyl esters, epoxies, phenols, urea-melamines, polyimides, copolymers and modified products thereof, and the like.

Furthermore, the resin (a2) may be added with fillers such as mica, talc, kaolin, hydrotalcite, sericite, bentonite, xonotlite, sepiolite, smectite, montmorillonite, wollastonite, silica, calcium carbonate, glass beads, glass flakes, glass microballoon, clay, molybdenum disulfide, titanium oxide, zinc oxide, antimony oxide, calcium polyphosphate, graphite, barium sulfate, magnesium sulfate, zinc borate, calcium borate, aluminum borate whisker, potassium titanate whisker and polymer compounds, conductivity imparting materials such as metal-based, metal oxide-based, carbon black and graphite powder, halogen-based flame retardants such as brominated resins, antimony flame retardants such as antimony trioxide and antimony pentoxide, phosphorus flame retardants such as ammonium polyphosphates, aromatic phosphates and red phosphorus, organic acid metal salt flame retardants such as boric acid metal salts, carboxylic acid metal salts and aromatic sulfonimide metal salts, inorganic flame retardants such as zinc borate, zinc, zinc oxide and zirconium compounds, nitrogen flame retardants such as cyanuric acid, isocyanuric acid, melamine, melamine cyanurate, melamine phosphate and nitrogenated guanidine, fluorine-based flame retardants such as PTFE, silicone flame retardants such as polyorganosiloxane, metal hydroxide flame retardants such as aluminum hydroxide and magnesium hydroxide, and other flame retardants, flame retardant aids such as cadmium oxide, zinc oxide, cuprous oxide, cupric oxide, ferrous oxide, ferric oxide, cobalt oxide, manganese oxide, molybdenum oxide, tin oxide and titanium oxide, pigments, dyes, lubricants, mold release agents, compatibilizers, dispersants, crystal nucleating agents such as mica, talc and kaolin, plasticizers such as phosphate esters, heat stabilizers, antioxidants, coloration preventing agents, ultraviolet absorbers, fluidity modifiers, foaming agents, antibacterial agents, vibration controlling agents, deodorants, sliding modifiers, and antistatic agents such as polyether ester amides, and the like, according to the application. In particular, when the application is an electrical and electronic equipment, an automobile, an aircraft, or the like, flame retardancy may be required, and a phosphorus flame retardant, a nitrogen flame retardant, and an inorganic flame retardant are preferably added.

It is preferable that the amount of the flame retardant is 1 to 20 parts by mass of with respect to 100 parts by mass of the resin, in order to keep a good balance of properties such as the mechanical characteristics of the resin used and resin fluidity during molding along with exhibition of flame retardant effect. More preferably, the amount of the flame retardant is 1 to 15 parts by mass.

On the other hand, an injection molding body (b) in an embodiment of the present invention is a molded body obtained by injection molding a discontinuous fiber (b1) and a resin (b2).

The injection molding body (b) contains the discontinuous fiber (b1) from the viewpoint of improving mechanical characteristics and heat resistance. The discontinuous fiber (b1) is not particularly limited, and examples thereof include those generally used as reinforcement fibers such as glass fibers, polyacrylonitrile-based, rayon-based, lignin-based, pitch-based carbon fibers (including graphite fibers), potassium titanate whisker, zinc oxide whisker, calcium carbonate whisker, wollastonite whisker, aluminum borate whisker, aramid fibers, alumina fibers, silicon carbide fibers, ceramic fibers, asbestos fibers, gypsum fibers, and metal fibers, and two or more types of fibers may be used in combination. Glass fibers are preferred from the viewpoint of material cost and mechanical characteristics, and carbon fibers are preferred from the viewpoint of light weight and mechanical characteristics.

The resin (b2) in the present invention is not particularly limited, and can be exemplified by the similar thermoplastic resin as exemplified in the resin (a2). Polyolefins, polyamides, polycarbonates, styrene resins, polyarylene sulfides, polyether ether ketones, and fluorine resins are preferred, and polyolefins, polyamides, and polyarylene sulfides are particularly preferred, from the viewpoint of moldability and mechanical characteristics.

The resin (b2) in the present invention is preferably the same type of resin as the resin (a2) from the viewpoint of integration with the substrate for reinforcement (a). Specific examples of the same type of resin include, in the case of a polyamide resin, polyamides and copolymerized polyamides containing 50% by mass or more of a structure such as polyamide 6, polyamide 11, polyamide 12, polyamide 66, polyamide 610 or polyamide 612. Further, resins having a functional group that chemically reacts with the resin (a2) are also preferably used. Furthermore, resins having a difference in SP value from the resin (a2) within 2.5 are also preferably used. The SP value can be calculated by, for example, a method of Fedors (Polymer Engineering and Science, vol. 14, No. 2, p147 (1974)).

As to the mass ratio of the discontinuous fiber (b1) and the resin (b2) in the injection molding body (b), the discontinuous fiber (b1) is preferably 5 to 200 parts by mass, more preferably 10 to 100 parts by mass, and particularly preferably 20 to 60 parts by mass, with respect to 100 parts by mass of the resin (b2), from the viewpoint of a balance of mechanical characteristics and moldability. Here, as a preferable range, it can also be set as a combination of either of the upper limits and either of the lower limits described above. Moreover, in an integrally molded body, a portion with a high mass ratio and a portion with a low mass ratio within the above preferable ranges may exist.

The discontinuous fiber (b1) is preferably surface-treated with a sizing agent from the viewpoint of improving mechanical characteristics. Examples of the sizing agent include polyfunctional epoxy resins, acrylic acid polymers, polyhydric alcohols, polyethyleneimines, and the like. Specific examples include polyglycidyl ethers of an aliphatic polyhydric alcohol such as glycerol triglycidyl ether, diglycerol polyglycidyl ether, polyglycerol polyglycidyl ether, sorbitol polyglycidyl ether, arabitol polyglycidyl ether, trimethylolpropane triglycidyl ether and pentaerythritol polyglycidyl ether, polyacrylic acid, copolymers of acrylic acid and methacrylic acid, copolymers of acrylic acid and maleic acid or a mixture of two or more thereof, polyvinyl alcohol, glycerol, diglycerol, polyglycerol, sorbitol, arabitol, trimethylolpropane, pentaerythritol, polyethyleneimine containing more amino groups in one molecule, and the like. Among them, glycerol triglycidyl ether, diglycerol polyglycidyl ether and polyglycerol polyglycidyl ether are preferably used in the present invention since they contain many highly reactive epoxy groups in one molecule, have high water solubility, and are easy to apply to the discontinuous fiber (b1).

The sizing agent is preferably contained in an amount of 0.01 to 5 parts by mass, and more preferably 0.1 to 2 parts by mass with respect to 100 parts by mass of the discontinuous fiber (b1). Here, as a preferable range, it can also be set as a combination of either of the upper limits and either of the lower limits described above. In addition, the sizing agent may not be uniformly applied to the discontinuous fiber (b1), and a portion that is selectively applied at a high concentration and a portion that is applied at a low concentration may be provided within the above preferable ranges.

In an embodiment of the present invention, examples of a means for applying the sizing agent to the discontinuous fiber (b1) include a method of immersing the discontinuous fiber (b1) in a liquid containing the sizing agent via a roller, a method of spraying a sizing agent in mist form on the discontinuous fiber (b1), and the like. At this time, it is preferable to dilute the sizing agent with a solvent and control temperature at application, yarn tension and the like so that the amount of the sizing agent adhered to the discontinuous fiber (b1) becomes more uniform. Examples of the solvent for diluting the sizing agent include water, methanol, ethanol, dimethylformamide, dimethylacetamide, acetone and the like, and water is preferred from the viewpoint of easy handling in a production process and disaster prevention. Such a solvent is removed by applying the sizing agent to the discontinuous fiber (b1) and then evaporating by heating. Moreover, when using a compound insoluble or hardly soluble in water as the sizing agent, it is preferable to add an emulsifier or a surfactant and use the compound as an aqueous dispersion. As the emulsifier or surfactant, an anionic emulsifier, a cationic emulsifier, a nonionic emulsifier or the like can be used. Among them, it is preferable to use a nonionic emulsifier having little interaction because it is less likely to inhibit the effect of the sizing agent.

From the viewpoint of improving the mechanical characteristics and dimensional accuracy of the injection molding body (b), the mass average fiber length Lw of the discontinuous fiber (b1) is preferably 0.4 mm or more. The longer the mass average fiber length, the higher the effect of improving strength and rigidity, and in particular, the effect of significantly improving impact strength can be obtained. The upper limit of the mass average fiber length Lw of the discontinuous fiber (b1) is preferably 3.0 mm or less. By setting the mass average fiber length Lw in this range, a balance of strength, rigidity and workability becomes good. Moreover, the mass average fiber length Lw of the discontinuous fiber (b1) is further preferably 0.4 mm or more and 1.0 mm or less. Here, the discontinuous fiber (b1) may not all have the same length, but may have different length distributions. The mass average fiber length Lw described above and the number average fiber length Ln described below can be used to represent a state in which the discontinuous fiber (b1) have different length distributions.

The number average fiber length Ln of the discontinuous fiber (b1) is a simple average value of the fiber length with respect to the number of measurements, and sensitively reflects the contribution of fibers having a short fiber length. The reinforcing effect based on the fiber length is larger as the fiber length is longer. Since there is a difference in the effects brought about by the fibers having a long fiber length and the fibers having a short fiber length, it is not preferable to handle them in the same way. When emphasizing the reinforcing effect achieved by the fibers having a long fiber length, it is preferable to consider the mass average fiber length Lw.

Furthermore, the fiber length distribution can be known from a ratio Lw/Ln of the mass average fiber length Lw to the number average fiber length Ln of the discontinuous fiber (b1). When the value of Lw/Ln is greater than 1, many fibers having a long fiber length are contained. The ratio Lw/Ln of the mass average fiber length Lw to the number average fiber length Ln of the discontinuous fiber (b1) is preferably 1.3 to 2.0.

In the present invention, the number average fiber length Ln of the discontinuous fiber (b1), the mass average fiber length Lw of the discontinuous fiber (b1), and the ratio Lw/Ln thereof are determined by the following method. That is, a sample having a size of 10 mm in length and 10 mm in width is cut out from the injection molding body (b) and used as a test piece. This test piece is immersed in a solvent in which the resin (b2) is soluble for 24 hours to dissolve the resin component. The test piece in which the resin component is dissolved is observed with a microscope at a magnification of 100 times. In this observation, the fiber length is measured for any 400 fibers in fibers in the field of view. The measured fiber length is defined as Li, and the number average fiber length Ln and the mass average fiber length Lw are calculated based on the following equation.

Number average fiber length $Ln=(\Sigma Li)/(N)$

Here, N is the number of measurement (400 fibers).

Mass average fiber length $Lw=(\Sigma Li^2)/(\Sigma Li)$

The injection molding body (b) may be added with fillers such as mica, talc, kaolin, hydrotalcite, sericite, bentonite, xonotlite, sepiolite, smectite, montmorillonite, wollastonite, silica, calcium carbonate, glass beads, glass flakes, glass microballoon, clay, molybdenum disulfide, titanium oxide, zinc oxide, antimony oxide, calcium polyphosphate, graphite, barium sulfate, magnesium sulfate, zinc borate, calcium borate, aluminum borate whisker, potassium titanate whisker and polymer compounds, conductivity imparting materials such as metal-based, metal oxide-based, carbon black and graphite powder, halogen-based flame retardants such as brominated resins, antimony flame retardants such as antimony trioxide and antimony pentoxide, phosphorus flame retardants such as ammonium polyphosphates, aromatic phosphates and red phosphorus, organic acid metal salt flame retardants such as boric acid metal salts, carboxylic acid metal salts and aromatic sulfonimide metal salts, inorganic flame retardants such as zinc borate, zinc, zinc oxide and zirconium compounds, nitrogen flame retardants such as cyanuric acid, isocyanuric acid, melamine, melamine cyanurate, melamine phosphate and nitrogenated guanidine, fluorine-based flame retardants such as PTFE, silicone flame retardants such as polyorganosiloxane, metal hydroxide flame retardants such as aluminum hydroxide and magnesium hydroxide, and other flame retardants, flame retardant aids such as cadmium oxide, zinc oxide, cuprous oxide, cupric oxide, ferrous oxide, ferric oxide, cobalt oxide, manganese oxide, molybdenum oxide, tin oxide, and titanium oxide, pigments, dyes, lubricants, mold release agents, compatibilizers, dispersants, crystal nucleating agents such as mica, talc and kaolin, plasticizers such as phosphate esters, heat stabilizers, antioxidants, coloration preventing agents, ultraviolet absorbers, fluidity modifiers, foaming agents, antibacterial agents, vibration controlling agents, deodorants, sliding modifiers, and antistatic agents such as polyether ester amides, and the like, according to the application. In particular, when the application is an electrical and electronic equipment, an automobile, an aircraft, or the like, flame retardancy may be required, and a phosphorus flame retardant, a nitrogen flame retardant, and an inorganic flame retardant are preferably added.

In the integrally molded body according to an embodiment of the present invention in which the substrate for reinforcement (a) and the injection molding body (b) as described above are integrated, the substrate for reinforcement (a) has a difference in "orientation angle ($\alpha$) of the discontinuous fiber (a1) in each of regions obtained by dividing a major axis direction of the substrate for reinforcement (a) into 10 equal parts" of within 10°. The orientation angle ($\alpha$) and its difference are calculated as follows.

First, the orientation angle ($\alpha$) of the discontinuous fiber (a1) in each region is calculated. The surface of the integrated substrate for reinforcement is polished, and 100 fibers are randomly selected in each of the regions obtained by dividing the major axis direction into 10 equal parts. The fibers on the polished surface are generally confirmed by an elliptical shape, and the major axis direction of the ellipse is taken as the fiber orientation direction. Using the direction of the weldline of the injection molding body as the reference of the angle, all angles formed by the orientation direction of the selected fibers with respect to the direction of the weldline (hereinafter, abbreviated as orientation angle $\alpha i$) are measured. Using this orientation angle $\alpha i$, the orientation angle ($\alpha$) of the discontinuous fiber (a1) in each region is calculated by the following equation.

$$\alpha = \Sigma(\alpha i)/100$$

$\alpha i$: Measured orientation angles (i=1, 2, 3, ..., 100) Then, the maximum value ($\alpha$max) and the minimum value ($\alpha$min) are identified from the values of "the orientation angles ($\alpha$) of the discontinuous fibers (a1)" in 10 regions, and "a difference in the orientation angle" is calculated from them as follows.

Difference in orientation angle (°)=$\alpha$max−$\alpha$min $\alpha$max=Maximum value of fiber orientation angles ($\alpha$) measured in each of regions obtained by dividing major axis direction of substrate for reinforcement into 10 equal parts $\alpha$min=Minimum value of fiber orientation angles ($\alpha$) measured in each of regions obtained by dividing major axis direction of substrate for reinforcement into 10 equal parts The substrate for reinforcement (a) having such an orientation angle difference covers the weldline of the injection molding body (b), whereby it is possible to ensure homogeneity as the entire integrally molded body and to suppress stress concentration, and then the bonding strength between the substrate for reinforcement (a) and the injection molding body (b) can be 7 MPa or more. When the bonding strength is less than 7 MPa, there are cases where the reinforcing effect of the weldline is not sufficient, and it is sometimes not a good integrally molded body. The bonding strength is preferably 10 MPa or more. The upper limit of the bonding strength is not particularly limited; if anything, when a bonding interface is completely integrated, the upper limit of the bonding strength is equal to the tensile strength of the resin used, and is, for example, 150 MPa in the case of polyamide.

Figure 2:
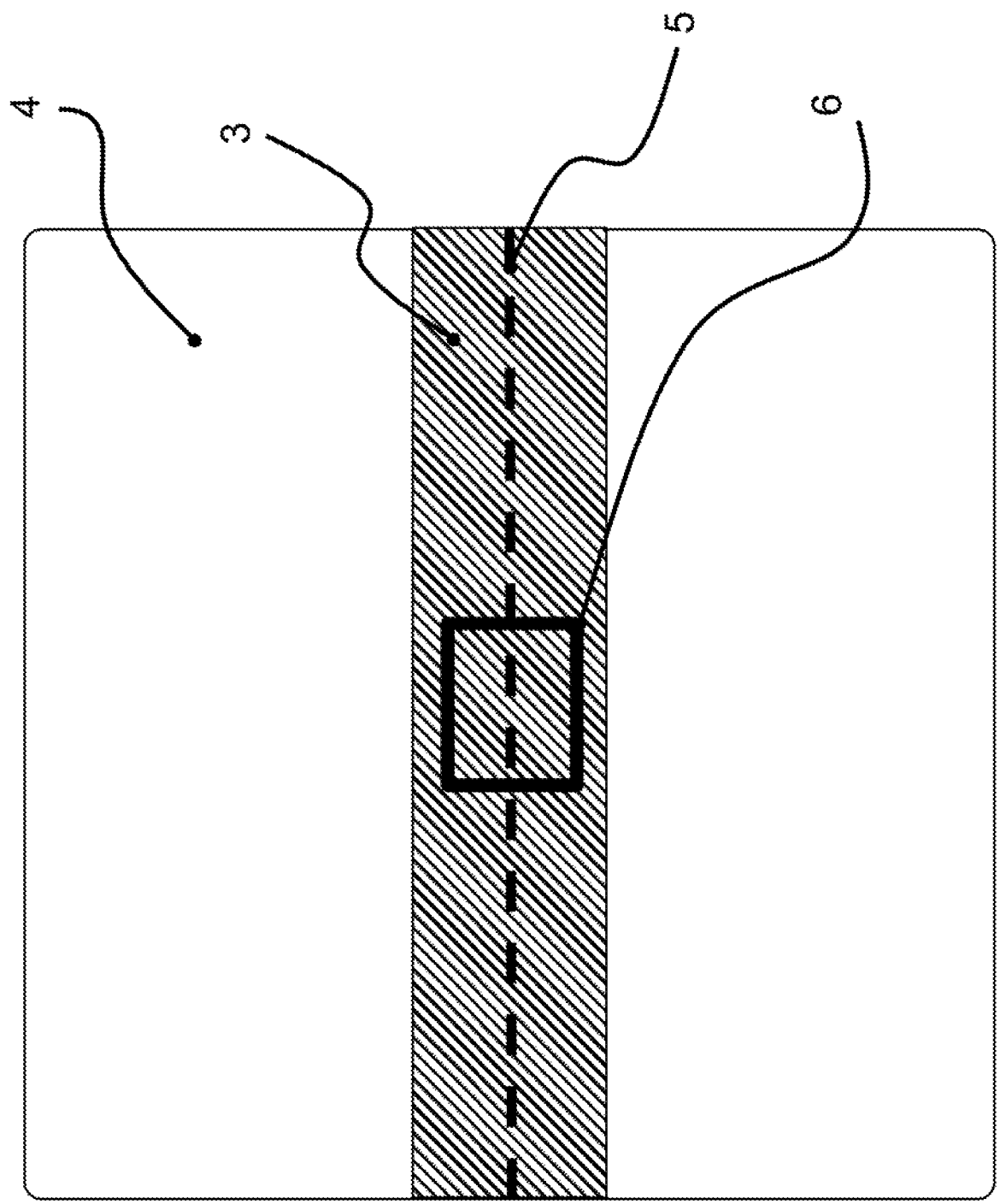
FIG. 2 is a schematic diagram showing an evaluation test piece cut-out position in the integrally molded body in which a weldline of an injection molding body is reinforced.

The method for measuring the bonding strength is as follows. First, a test piece (FIG. 3(*a*)) is cut out as shown in FIG. 2 from a part where the substrate for reinforcement and the injection molding body are integrated. Next, an adhesive (for example, ThreeBond 1782, manufactured by ThreeBond Co., Ltd.) is applied to a jig of a measuring apparatus as shown in FIG. 3(*b*) and left at 23±5° C. and 50±5% RH for 4 hours, then the test piece is bonded and fixed. Next, a tensile test is performed at an atmospheric temperature of 25° C. At this point, before starting the test, a state where the test piece is not subjected to a tensile test load is maintained for at least 5 minutes, a thermocouple is arranged on the test piece, and it is confirmed that the temperature becomes equal to the atmospheric temperature; then a tensile test is performed. The tensile test is performed by pulling in the 90° direction from the bonding surface of both at a tensile speed of 1.27 mm/min, and a value obtained by dividing the maximum load (a load when the substrate for reinforcement and the injection molding body start to separate, that is, a breaking load) by the bonding area is taken as the bonding strength (unit: MPa). The number of samples is n=5, and the average thereof is taken.

Furthermore, in am embodiment of the present invention, the substrate for reinforcement (a) having the orientation angle difference as described above covers the weldline of the injection molding body (b), whereby it becomes possible to uniformly integrate with the injection molding body and the thickness variation of the substrate for reinforcement in the integrally molded body becomes 10% or less. The thickness variation generally easily occurs in the substrate for reinforcement when the substrate for reinforcement and the injection molding body are integrated. In a case where the thickness variation is larger than 10%, as a result of stress concentration at the thickness fluctuating part when a load is applied to the molded body, it may be a starting point of the molded body destruction. Preferably the thickness variation is less than 5%. The lower limit of the thickness variation is not particularly limited, and is 0% if anything. In addition, when the thickness variation is large and exceeds 10%, stress tends to concentrate in a thin position, and the bonding strength between the substrate for reinforcement (a) and the injection molding body (b) described below may not be sufficient.

Figure 4:
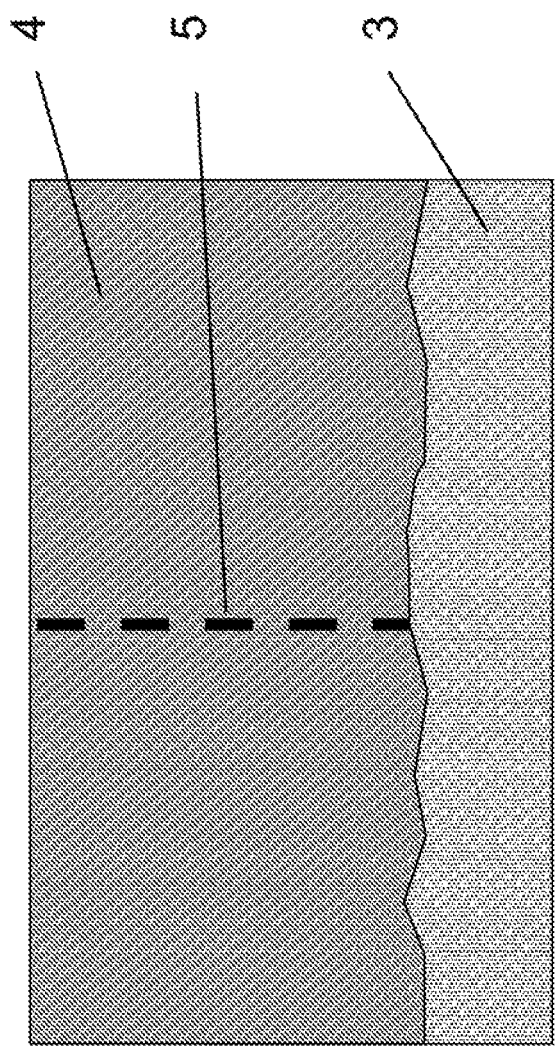
FIG. 4 is a schematic diagram of a measurement surface for thickness variation of a substrate for reinforcement in an integrally molded body.

The method for measuring the thickness variation is as follows. The part where the substrate for reinforcement and the injection molding body are integrated is cut out from the integrally molded body as shown in FIG. 2, embedded in an epoxy resin and then polished so that a cut surface is used as an observation surface as shown in FIG. 4 to prepare a test piece. The test piece is magnified 200 times with a laser microscope (for example, VK-9510, manufactured by Keyence Corporation), and the thickness of the substrate for reinforcement is observed. The observation image is developed on a general-purpose image analysis software, and average thickness t1, maximum thickness t2 and minimum thickness t3 of the substrate for reinforcement visible in the observation image are measured using a program incorporated in the software and the like. The thickness variation (%) of the substrate for reinforcement in the integrally molded body is calculated from the following equation. The average thickness t1 of the substrate for reinforcement is measured at each dividing point excluding both ends when the substrate for reinforcement cross section in the observation image is divided into ten equal parts in the width direction, and the average value thereof is taken as the average thickness of the substrate for reinforcement.

Thickness variation (%)=((t2 (mm)−t3 (mm))/t1 (mm))/100.

Also, the substrate for reinforcement (a) is preferably configured as follows, from the viewpoint of a reinforcing effect on the weldline formed in the injection molding body (b) and moldability of the injection molding body (b). That is, it is preferred that a ratio of the thickness Ta of the substrate for reinforcement (a) to the thickness T at the weldline part of the integrally molded body composed of the substrate for reinforcement (a) and the injection molding body (b) is made equal to or less than the value determined by the following formula expressed using flexural modulus Ebw at the weldline of the injection molding body (b) and flexural modulus Ea of the substrate for reinforcement (a direction perpendicular to the weldline, i.e., a width direction of the weldline) (hereinafter, sometimes referred to as the neutral ratio of substrate for reinforcement).

In a case of Ea≠Ebw,

Neutral ratio of substrate for reinforcement=(Ebw−√(Ea×Ebw))/(Ebw−Ea)

In a case of Ea=Ebw,

Neutral ratio of substrate for reinforcement=0.5

Ea: Flexural modulus of substrate for reinforcement (a) in width direction of weldline, and Ebw: Flexural modulus of weldline of injection molding body (b) in width direction of weldline.

When Ta/T is larger than the neutral ratio of substrate for reinforcement, an improvement in the reinforcing effect due to increase in the thickness of the substrate for reinforcement is small, and the thickness of the substrate for reinforcement (a) is increased. Further, when the injection molding body (b) is integrally molded with the substrate for reinforcement (a), resin fluidity at a position corresponding to the weldline is not sufficient, and it is difficult to obtain a good molded body. From the similar viewpoint, Ta/T is more preferably 0.9 or less of the neutral ratio of substrate for reinforcement.

On the other hand, Ta/T is preferably 0.05 or more of the neutral ratio of substrate for reinforcement. When the thickness is less than 0.05 of the ratio of the neutral ratio of substrate for reinforcement, the reinforcing effect of the weldline part by the substrate for reinforcement (a) tends to be small, and physical properties at the weldline part of the integrally molded body may not be sufficient. The ratio of the neutral ratio of substrate for reinforcement is more preferably 0.2 or more.

More specifically, the substrate for reinforcement (a) preferably has a thickness of 0.25 mm or less, from the viewpoint of handleability of itself and the moldability of the injection molding body (b). In a case where the thickness is thicker than 0.25 mm, the resin fluidity at the weldline is not sufficient when the molded body including the injection molding body (b) is integrally molded, and a good molded body sometimes cannot be obtained. More preferably, the thickness is 0.2 mm or less. On the other hand, the substrate for reinforcement (a) preferably has a thickness of 0.03 mm or more. When the thickness is less than 0.03 mm, it is difficult to handle the substrate for reinforcement (a), and the substrate for reinforcement may be torn in a process of inserting into the mold. The thickness is more preferably 0.05 mm or more.

Here, as to the thickness of the substrate for reinforcement, two points X and Y are determined on the same surface of the substrate so that linear distance XY is the longest, the thickness is measured at each dividing point excluding both ends XY when the straight line XY is divided into 10 equal parts, and the average value thereof is taken as the thickness of the substrate for reinforcement.

In the integrally molded body of the present invention, a ratio Ea/Eb of flexural modulus Ea of the substrate for reinforcement (a) to flexural modulus Eb of the injection molding body (b) at the non-weldline part is preferably 0.7 to 1.3. When the ratio of the flexural modulus is 0.7 to 1.3, stress is hardly concentrated on the bonding surface of the injection molding body and the substrate for reinforcement or the end of the substrate for reinforcement, and it is possible to obtain a molded body that achieves both reinforcement of the weldline and strength of the integrally molded body. The ratio is more preferably 0.8 to 1.2. Here, as a preferable range, it can also be set as a combination of either of the upper limits and either of the lower limits described above. Further, the ratio of the elastic modulus may be constant throughout the non-weldline part of the integrally molded body, but a portion with a high ratio and a portion with a low ratio may exist in the above preferable ranges.

More specifically, the substrate for reinforcement (a) preferably has a flexural modulus of 10 GPa or more. The flexural modulus is more preferably 15 GPa or more. The lower limit of the flexural modulus is not particularly limited. When the flexural modulus of the substrate for reinforcement (a) is 10 GPa or more, deformation of the substrate for reinforcement due to a molding pressure (pressure of the resin for injection molding) when integrating the substrate for reinforcement and the injection molding body is suppressed, and twisting or distortion of the substrate for reinforcement after the integration is unlikely to occur. Furthermore, in case of the flexural modulus of the substrate for reinforcement (a) being 15 GPa or more, even the width of the substrate for reinforcement is reduced, twisting or distortion of the substrate for reinforcement after the integration is unlikely to occur. In addition, when the flexural modulus of the substrate for reinforcement (a) is substantially isotropic, twisting or distortion of the substrate for reinforcement after the integration is unlikely to occur even the molding pressure is applied from any direction on the substrate for reinforcement during the process of integration the substrate for reinforcement and the injection molding body.

Moreover, the injection molding body (b) also preferably has a flexural modulus of 10 GPa or more at the non-weldline part. It is more preferably 15 GPa or more, and further preferably 20 GPa or more. The lower limit of the flexural modulus is not particularly limited. When the flexural modulus of the injection molding body (b) at the non-weldline part is 10 GPa or more, and further 15 GPa or more, an integrally molded body with high rigidity is obtained.

The flexural modulus of the substrate for reinforcement (a) and the injection molding body (b) at the non-weldline part is measured in accordance with the ISO178 method (1993). The number of each measurement is n=5, and the average value is taken as the flexural modulus of the substrate for reinforcement (a) and the injection molding body (b). Then, the flexural modulus ratio Ea/Eb is determined from the flexural modulus of the substrate for reinforcement (a) and the injection molding body (b). Here, the "non-weldline part" refers to a portion other than the weldline of the injection molding body, and refers to a portion that can exhibit the original characteristics of the used resin for injection molding. Moreover, since it is considered that physical properties of the substrate for reinforcement used in the present invention do not change before and after the integration, the physical property values before the integration can be substituted as the physical property values after the integration.

In the integrally molded body of the present invention, a ratio σa/σb of flexural strength σa of the substrate for reinforcement (a) to flexural strength σb of the injection molding body (b) at the non-weldline part is preferably 0.7 to 1.3. When the flexural strength ratio is 0.7 to 1.3, reinforcement of the weldline of the injection molding body is not excessively reinforced, thus it is preferable from the viewpoint of cost reduction and weight reduction of the molded body. The ratio σa/σb is more preferably 0.8 to 1.2. Here, as a preferable range, it can also be set as a combination of either of the upper limits and either of the lower limits described above. Further, the ratio of the flexural strength may be constant throughout the non-weldline part of the integrally molded body, but a portion with a high ratio and a portion with a low ratio may exist in the above preferable ranges. Specifically, the substrate for reinforcement (a) preferably has a flexural strength of 200 MPa or more. The flexural strength is more preferably 300 MPa or more. Moreover, the injection molding body (b) also preferably has a flexural strength at the non-weldline part of 200 MPa or more. The flexural strength is more preferably 300 MPa or more. The lower limit of the flexural strength is not particularly limited. It is preferable that the flexural strength of the injection molding body (b) and also the flexural strength of the substrate for reinforcement (a) are 200 MPa or more, since the integrally molded body is unlikely to break even a load is applied thereto.

The flexural strength of the substrate for reinforcement (a) and of the injection molding body (b) at the non-weldline part is measured in accordance with the ISO178 method (1993). The number of each measurement is n=5, and the average value is taken as the flexural strength of the substrate for reinforcement (a) and of the injection molding body (b). Then, the flexural strength ratio σa/σb is determined from the flexural strength of the substrate for reinforcement (a) and of the injection molding body (b). In order to set the ratio of the flexural strength of the substrate for reinforcement (a) and of the injection molding body (b) within the above ranges, for example, the respective fiber contents may be set to an equivalent level.

Furthermore, the substrate for reinforcement (a) is preferably substantially isotropic. The term "substantially isotropic" refers that the flexural strength, flexural modulus, and linear expansion coefficient of the substrate for reinforcement (a) are equivalent regardless of the measurement direction. More specifically, it is preferable to show that test pieces are cut out in four directions 0°, +45°, −45°, and 90°, setting an arbitrary direction of the substrate for reinforcement (a) to 0° direction, and for the test pieces in the respective directions, the flexural strength and flexural modulus are measured in accordance with the ISO178 method (1993) and the linear expansion coefficient is measured according to ISO11359-2 (1999, TMA), and the maximum value thereof is 1.3 times or less the minimum value thereof, that is, the flexural strength, flexural modulus and linear expansion coefficient are uniform regardless of the direction. It is preferable that the substrate for reinforcement (a) is substantially isotropic because it can be integrally reinforced with the injection molding body without considering the direction of the substrate when reinforcing the weldline. Further, even the substrate for reinforcement is integrated with a thin-walled or complex-shaped molded body by injection molding, it is possible to prevent fiber disturbance of the substrate for reinforcement and burial of the substrate for reinforcement in the injection molding resin by molding pressure, which is preferable.

In order to make the substrate for reinforcement (a) substantially isotropic, it is preferable that the discontinuous fibers (a1) are substantially in the form of monofilament and randomly dispersed. Here, the fact that the discontinuous fibers (a1) are substantially in the form of filament refers that the discontinuous fibers (a1) are present in less than 500 fineness strands. More preferably, the discontinuous fibers (a1) are dispersed in the form of monofilament. Further, being randomly dispersed refers that the arithmetic average value of the two-dimensional orientation angle of the discontinuous fibers in the cross-sectional observation image of the substrate for reinforcement (a) is within the range of 30° or more and 60° or less. The two-dimensional orientation angle refers to an angle formed by two discontinuous fibers (a) crossing each other and is defined as an angle on an acute angle side within the range of 0° or more and 90° or less out of angles formed by the single filaments crossing each other.

The method for obtaining the substrate for reinforcement (a) in which the discontinuous fibers (a1) are randomly oriented is not particularly limited. Examples thereof include (1) a method by opening and dispersing discontinuous fiber bundles having a chopped form under an air flow jet, accumulating the dispersion on a conveyor belt, impregnating and complexing the resin therein, and press-molding the mixture, (2) a method by opening and mixing discontinuous fiber bundles having a chopped form and resin fibers under an air flow jet, accumulating the mixture on a conveyor belt, and press molding the mixture, (3) a method by opening and dispersing discontinuous fibers having a chopped form in a dispersion, papermaking the dispersion on a perforated support, impregnating and complexing the resin therein, and press-molding the mixture, (4) a method by opening and mixing discontinuous fiber bundles having a chopped form and resin fibers in a dispersion, papermaking the mixture on a perforated support, and press-molding the mixture, (5) a method by opening and dispersing discontinuous fibers having a chopped form by a carding machine, accumulating the dispersion on a conveyor belt, impregnating and complexing the resin therein, and press-molding the mixture, (6) a method by opening and mixing discontinuous fiber bundles having a chopped form and resin fibers by a carding machine, accumulating the mixture on a conveyor belt, and press molding the mixture, and the like. More preferably, the method of any one of (1) to (4) which are excellent in openability of the discontinuous fiber bundle and can maintain the fiber length of the discontinuous fibers is used, and further preferably, the method of (3) or (4) is used from the viewpoint of productivity.

In the method of (1) or (2), the isotropy of the substrate for reinforcement (a) may be improved by controlling the flow of the air flow to disperse the discontinuous fibers uniformly in the form of single fiber. In the method of (3) or (4), the isotropy of the substrate for reinforcement (a) may be improved by lowering the concentration of the discontinuous fibers relative to the amount of the dispersion, forming a stirring blade for stirring the dispersion with a large stirring force, or increasing the rotation speed of the stirring blade to disperse the discontinuous fibers uniformly in the form of single fiber.

From the viewpoint of enhancing the lightness of the molded body, the specific gravity of the substrate for reinforcement (a) is preferably 0.5 to 1.5. It is more preferably 0.5 to 1.3, and further preferably 0.5 to 1.1. The specific gravity is measured by cutting out the substrate for reinforcement (a) and measuring it in accordance with ISO1183 (1987).

Further, the substrate for reinforcement (a) preferably has a linear expansion coefficient of $7 \times 10^{-6}$/K or less. The linear expansion coefficient is more preferably $5 \times 10^{-6}$/K or less. Moreover, it is more preferable that the substrate for reinforcement (a) has a linear expansion coefficient of $7 \times 10^{-6}$/K or less, and is substantially isotropic. The lower limit of the linear expansion coefficient is not particularly limited.

The linear expansion coefficient is measured in accordance with ISO11359-2 (1999). When the linear expansion coefficient of the substrate for reinforcement (a) is $7 \times 10^{-6}$/K or less, deformation of the substrate for reinforcement is suppressed during the process of integrating the substrate for reinforcement and the injection molding body, and twisting or distortion of the substrate for reinforcement after the integration is unlikely to occur. Furthermore, when the linear expansion coefficient of the substrate for reinforcement (a) is $5 \times 10^{-6}$/K or less, twisting or distortion of the substrate for reinforcement after the integration is unlikely to occur even though the width of the substrate for reinforcement is reduced.

The shape of the substrate for reinforcement (a) is not particularly limited, and examples thereof include a sheet shape and a tape shape. A tape-shaped substrate is preferred from the viewpoint of efficiently arranging along the weldline. When the substrate for reinforcement is in the form of a tape, it has flexibility and excellent handling, and it is possible to insert the substrate for reinforcement (a) into the injection molding mold using an automated tape laying device ATL (Automated Tape Laying) or the like, which is preferable in terms of productivity and adaptability to complex shapes. The tape shape refers to a thin and elongated strip shape.

Then, in the integrally molded body of the present invention, it is preferable that the substrate for reinforcement (a) is integrated with the injection molding body over a distance of 2.5 to 15 mm in the width direction of the weldline of the injection molding body (b). It is preferable to integrate with the injection molding body over a distance of 2.5 to 15 mm in the width direction of the weldline because both reinforcement of weldlines and weight reduction and moldability of the molded body can be achieved. Therefore, the substrate for reinforcement (a) preferably also has a width (width direction of weldline) of 2.5 to 15 mm. The distance is more preferably 3 to 12.5 mm, and further preferably 5 to 10 mm. Here, as a preferable range, it can also be set as a combination of either of the upper limits and either of the lower limits described above. Further, there may be a portion that is widely integrated and a portion that is narrowly integrated within the above preferred ranges.

The length of the substrate for reinforcement (a) is preferably 1.2 times or more, and more preferably 2 times or more the width of the substrate for reinforcement. The upper limit of the length of the substrate for reinforcement is not particularly limited. Furthermore, the substrate for reinforcement (a) preferably has a thickness of 0.03 to 0.25 mm.

In addition, since the width of the weldline changes depending on the thickness of the integrally molded body, it is preferable that the substrate for reinforcement (a) satisfies the following relationship in the width direction of the weldline of the injection molding body (b), and covers a part or all of the weldline to be integrated with the injection molding body (b).

$$1 \leq Wa/5\sqrt{T} \leq 10$$

Wa: Width of substrate for reinforcement (a)
T: Thickness of weldline part of integrally molded body, It is preferable to satisfy the above relationship because both reinforcement of the weldline and weight reduction and moldability of the molded body can be achieved. More preferably, it is $2 \leq Wa/5\sqrt{T} \leq 5$.

Furthermore, in the integrally molded body of the present invention, the substrate for reinforcement (a) is preferably 50% or less with respect to the projected area of the integrally molded body. That is, when the integrally molded body is arranged such that a surface of the substrate for reinforcement (a) disposed is placed in the horizontal direction and facing upward and projected from above, it is preferable that the substrate for reinforcement (a) is disposed in a range of 50% or less of the projected area of the integrally molded body. When the area ratio is 50% or less, the fluidity of the resin for injection molding in the injection molding mold cavity is improved, so that it may be advantageous for thin wall molding or complex shape molding. Moreover, it is excellent also from the viewpoint of discharge of air or decomposition gas of the injection molding resin during injection molding and weight reduction of the molded body. The above ratio is preferably 30% or less. Further, the lower limit of the area of the substrate for reinforcement (a) to the projected area of the integrally molded body is preferably 5% or more and further preferably 10% or more from the viewpoint of reinforcement of weldlines.

Such an integrally molded body of the present invention can be produced by the following method, for example. In integrating the substrate for reinforcement (a) having a discontinuous fiber (a1) and a resin (a2) with the weldline of the injection molding body (b) having a discontinuous fiber (b1) and a resin (b2), (i) when the substrate for reinforcement (a) is arranged (laid up) in a mold, as the substrate for reinforcement (a), one having a difference in the orientation angle of the discontinuous fiber (a1) in each of regions obtained by dividing a length direction of the substrate for reinforcement (a) when arranged in the mold into 10 equal parts of within 10° is used. In this way, when the substrate for reinforcement (a) is laid up in the mold, the ratio of the area of the substrate for reinforcement (a) not in contact with the mold can be reduced to 5% or less, and the integrally molded body as described above can be obtained. Further, (ii) when the substrate for reinforcement (a) is directly laid up on the injection molding body (b), as the substrate for reinforcement (a), one having a difference in the orientation angle of the discontinuous fiber (a1) in each of regions obtained by dividing a length direction of the substrate for reinforcement (a) when laid up on the injection molding body (b) into 10 equal parts of within 10° is used. In this way, when the substrate for reinforcement (a) is laid up on the injection molding body (b), the area of the substrate for reinforcement (a) not in contact with the injection molding body (b) can be reduced to 5% or less, and the integrally molded body as described above can be obtained.

That the difference in the orientation angle of the discontinuous fiber (a1) in each of regions obtained by dividing the length direction of the substrate for reinforcement (a) when arranging the substrate for reinforcement (a) in the mold or laying up the substrate for reinforcement (a) on the injection molding body (b) into 10 equal parts is within 10% means that there is little substrate disturbance of the substrate for reinforcement (a) duing the process of integration of the substrate for reinforcement (a) and the injection molding body (b). Then, since the fibers in the substrate for reinforcement are uniformly dispersed, it is possible to prevent stress concentration.

The substrate for reinforcement (a) and the injection molding body (b) are integrated each other at the same time as the injection molding, by arranging the substrate for reinforcement (a) in an injection molding mold when the injection molding body (b) is obtained by injection molding or are integrated by directly laying up the substrate for reinforcement (a) on the injection molding body (b). The substrate for reinforcement (a) is integrated with the injection molding body (b) so as to cover a part or all of the weldline of the injection molding body (b), by arranging the substrate for reinforcement (a) in a position where a weldline in the injection molding mold is expected and then performing injection molding, or laying up the substrate for reinforcement (a) in a part where the weldline of the injection molding body (b) exists.

Examples of the method for arranging the substrate for reinforcement (a) in the injection molding mold include a method of pre-shaping the substrate for reinforcement (a) in advance and then inserting it into the mold for molding, a method of softening and melting the substrate for reinforcement (a) to be stuck in the mold by heater heating, laser heating or the like, by the automated tape laying device ATL, and the like. The method of pre-shaping the substrate for reinforcement (a) in advance and then inserting it into the mold for molding is preferable because an integrally molded body having excellent dimensional accuracy can be obtained with high productivity.

Similarly, examples of the method for directly laying up the substrate for reinforcement (a) on the injection molding body (b) include a method of pre-shaping the substrate for reinforcement (a) in advance and then laying it up on the injection molding body (b) for integration, a method of softening and melting the substrate for reinforcement (a) to be laid up on the injection molding body (b) by heater heating, laser heating or the like, by the automated tape laying device ATL, and the like. The method of pre-shaping the substrate for reinforcement (a) in advance and then integrating it with the injection molding body (b) is preferable because an integrally molded body having excellent dimensional accuracy can be obtained with high productivity.

Examples of the method of pre-shaping the substrate for reinforcement (a) in advance include press molding, autoclave molding, pultrusion molding, and the like, and press molding is preferable from the viewpoint of both productivity and compatibility with complex shapes. Further, the pre-shaping may be performed in a plurality of times. That is, a plurality of sheets subjected to the above-described molding may be stacked, again subjected to the above-described molding, and heated and fused.

In the present invention, ratio Sa of the area of the substrate for reinforcement (a) not in contact with the mold when the substrate for reinforcement (a) is laid up in the mold is a ratio of an area excluding surface area Sc of the substrate for reinforcement (a) actually stuck to the injection molding mold by injection molding from Sb, to surface area Sb of the side stuck to the injection molding mold, in the substrate for reinforcement (a) at the time of insertion, and it can be calculated by the following equation.

$$Sa\ (\%)=(|Sb-Sc|/Sb)\times 100$$

In other words, Sb referred herein is a maximum area that can be stuck when the substrate for reinforcement (a) to be used is inserted into the mold, and usually can be determined from dimensions of the substrate for reinforcement (a) before insertion using a caliper or a ruler. Regarding Sc, the substrate for reinforcement (a) with a paint applied on the surface was stuck into the injection molding mold and then removed, and Sc can be determined from dimensions of the paint transferred to the injection molding mold using a caliper or a ruler.

The ratio Sa of the area of the substrate for reinforcement (a) not in contact with the mold when laid up in the mold is 5% or less, whereby occurrence of molding defects such that the injection molding mold does not close can be reduced. Further, since the pressure by the injection molding body (b) which is obtained by injection molding is applied to the substrate for reinforcement (a) in a direction of pressing against the injection molding mold, the position of the substrate for reinforcement (a) is unlikely to shift. Therefore, the obtained integrally molded body is excellent in the accuracy of the position of the substrate for reinforcement (a) and the dimensions as an integrally molded article. Furthermore, since the substrate for reinforcement (a) can be arranged with high accuracy, an integrally molded body having excellent mechanical characteristics is obtained. From this point of view, the area ratio of the substrate for reinforcement (a) not in contact with the mold when laid up in the mold is more preferably 2% or less. By setting the area ratio to 2% or less, it is possible to reduce the injection molding body (b) that enters between the substrate for reinforcement (a) and the injection molding mold, and the position of the substrate for reinforcement (a) is more unlikely to shift, thus an integrally molded body having excellent dimensional accuracy is obtained.

In order to control the area ratio of the substrate for reinforcement (a) not in contact with the mold when laid up in the mold to 5% or less, it is also preferable to make the substrate for reinforcement (a) substantially isotropic. In the injection molding, since the surface of the injection molding mold is heated and is subjected to pressure by the heated and melted injection molding body (b) during the injection molding, it is also preferable that the resin (a2) in the substrate for reinforcement (a) is a polyarylene sulfide excellent in elastic modulus and heat resistance.

Further, in the present invention, ratio Sd of the area of the substrate for reinforcement (a) not in contact with the injection molding body (b) when the substrate for reinforcement (a) is laid up directly on the injection molding body (b) is a ratio of an area excluding surface area Sf of an adhesion mark left on the injection molding body after peeling the substrate for reinforcement (a) after the integration from the integrally molded body, from area Se, to the area Se of the substrate for reinforcement (a), and it can be calculated by the following equation.

$$Sd\ (\%)=(|Se-Sf|/Se)\times 100$$

When the substrate for reinforcement (a) is laid up on the injection molding body (b), the ratio of the area of the substrate for reinforcement (a) not in contact with the injection molding body (b) is 5% or less, whereby an integrally molded body having excellent mechanical characteristics is obtained. From this point of view, the ratio of the area of the substrate for reinforcement (a) not in contact with the injection molding body (b) when laid up on the injection molding body (b) is more preferably 2% or less.

In order to control the ratio of the area of the substrate for reinforcement (a) not in contact with the injection molding body (b) when laid up directly on the injection molding body (b) to 5% or less, it is preferable to make the substrate for reinforcement (a) substantially isotropic. Further, when the substrate for reinforcement (a) is laid up on the injection molding body (b), the substrate for reinforcement (a) is heated and pressurized. Therefore, a substrate that is hardly deformed even when heated and pressurized is preferred, and the resin (a2) of the substrate for reinforcement (a) is preferably a polyarylene sulfide excellent in elastic modulus and heat resistance.

The integrally molded body of the present invention that can be produced as described above can improve strength and rigidity of the weldline, which is a problem of the injection molding body, while having a merit that a complex molded body can be molded with high productivity that is an advantage of injection molding. Therefore, it can be used, for example, for various applications such as automotive parts, aircraft parts, electrical and electronic parts, office automation equipment, building members, home appliances, medical equipment, various vessels, daily necessities, household goods, and sanitary goods. Specific applications include automotive underhood parts, automotive interior parts, automotive exterior parts, automotive connectors, electrical and electronic parts, building members, mechanical parts, and vessels and tableware.

Further specifically, examples of the automotive underhood parts include air flow meters, air pumps, thermostat housings, engine mounts, ignition bobbins, ignition cases, clutch bobbins, sensor housings, idle speed control valves, vacuum switching valves, ECU housings, vacuum pump cases, inhibitor switches, rotation sensors, acceleration sensors, distributor caps, coil bases, ABS actuator cases, top and bottom of radiator tanks, cooling fans, fan shrouds, engine covers, cylinder head covers, oil caps, oil pans, oil filters, fuel caps, fuel strainers, distributor caps, vapor canister housings, air cleaner housings, timing belt covers, brake booster parts, various cases, various tubes, various tanks, various hoses, various clips, various valves, various pipes, and the like.

Examples of the automotive interior parts include torque control levers, safety belt parts, register blades, washer levers, window regulator handles, knobs for window regulator handles, passing light levers, sun visor brackets, various motor housings, and the like.

Examples of the automotive exterior parts include roof rails, fenders, garnishes, bumpers, door mirror stays, spoilers, hood louvers, wheel covers, wheel caps, grill apron cover frames, lamp reflectors, lamp bezels, door handles, and the like.

Examples of the automotive connectors include wire harness connectors, SMJ connectors, PCB connectors, and door grommet connectors.

Examples of the electrical and electronic parts include relay cases, coil bobbins, optical pickup chassis, motor cases, housings and internal parts for laptops, housings and internal parts for CRT displays, housings and internal parts for printers, housings and internal parts for mobile terminals including mobile phones, mobile computers, and handheld-type mobiles, housings and internal parts for recording media (e.g., CD, DVD, PD, and FDD) drives, housings, and internal parts for copiers, housings and internal parts for facsimile devices, parabolic antennas, VTR parts, television parts, irons, hair dryers, rice cooker parts, microwave oven parts, acoustic parts, parts for video equipment including video cameras and projectors, substrates for optical recording media including compact disc (CD), CD-ROM, CD-R, CD-RW, DVD-ROM, DVD-R, DVD-RW, DVD-RAM, and Blu-ray disc, illumination parts, refrigerator parts, air conditioner parts, typewriter parts, and word processor parts, housings and internal parts for electronic musical instruments, home game consoles, and portable game consoles, various gears, various cases, sensors, LEP lamps, connectors, sockets, resistors, relay cases, switches, coil bobbins, capacitors, variable capacitor cases, optical pickups, radiators, various terminal blocks, transformers, plugs, printed circuit boards, tuners, speakers, microphones, headphones, small motors, magnetic head bases, power modules, semiconductors, liquid crystals, FDD carriages, FDD chassis, motor brush holders, transformer members, coil bobbins, and the like.

Examples of the building members include sash rollers, blind curtain parts, pipe joints, curtain liners, blind parts, gas meter parts, water meter parts, water heater parts, roof panels, adiabatic walls, adjusters, plastic floor posts, ceiling hangers, stairs, doors, floors, and the like.

Examples of the mechanical parts include gears, screws, springs, bearings, levers, key stems, cams, ratchets, rollers, water-supply parts, toy parts, banding bands, clips, fans, pipes, washing jigs, motor parts, microscopes, binoculars, cameras, watches, and the like.

Examples of the vessels and tableware include vessels and tableware such as trays, blisters, knives, forks, spoons, tubes, plastic cans, pouches, containers, tanks, and baskets, hot-fill containers, containers for microwave oven cooking, containers for cosmetics, and the like.

Among these, it is suitable for automotive interior parts, automotive exterior parts, automotive connectors, electrical and electronic parts and electronic equipment housings that are required to be thin, lightweight, and rigid.

EXAMPLES

Hereinafter, the present invention will be described in more detail with reference to examples.

(1) Fiber Mass Content Waf (%) of Reinforcement Fibers in Substrate for Reinforcement Any five locations of the substrate for reinforcement were cut out, and mass Wa1 for each of the cut out substrates for reinforcement was measured, then the substrate for reinforcement was heated in air at 600° C. for 1 hour to burn off a resin component. Then, mass Wa2 of remaining reinforcement fibers was measured, and it was calculated by the following equation. The average value of the fiber mass content ratios Waf measured at five locations was taken as a fiber mass content ratio of the reinforcement fibers in the substrate for reinforcement.

$$Waf (\%) = 100 \times Wa2/Wa1$$

(2) Thickness Ta of Substrate for Reinforcement

Two points X and Y are determined on the same surface of the substrate for reinforcement so that linear distance XY is the longest, the thickness is measured at each dividing point excluding both ends XY when the straight line XY is divided into ten equal parts, and the average value thereof is taken as thickness Ta (mm) of the substrate for reinforcement.

(3) Bulk Density of Substrate for Reinforcement

Square (100 mm square) substrates for reinforcement were cut out from any five locations, mass Wa3 was measured for each of the cut out substrates for reinforcement, the bulk density was calculated from the following equation, and the average value thereof was adopted.

Bulk density of substrate for reinforcement=$Wa3$ (g)/(10 (cm)×10 (cm)×$Ta$ (cm))

Ta: Thickness (cm) of substrate for reinforcement

When a 100 mm square cannot be cut out, the largest square that can be cut out is cut out, and the bulk density is calculated by the following equation.

Bulk density of substrate for reinforcement=$Wa3$ (g)/(Area of cut-out square substrate for reinforcement (cm$^2$)×$Ta$ (cm))

(4) Flexural Strength σa and Flexural Modulus Ea of Substrate for Reinforcement

For a substrate for reinforcement with a thickness of less than 1 mm, the substrate for reinforcement was piled up in a stamping molding mold having a box-shaped cavity with a thickness of 1.1 mm so that the thickness of the piled-up substrate for reinforcement had a thickness larger than the cavity thickness of the mold. Next, the mold was closed, pressurized at a molding pressure of 30 MPa and held for 2 minutes, and then the mold was opened and removed to prepare a test molded plate (substrate for reinforcement). A test piece was cut out from the test molded plate, and the flexural characteristics were determined according to the ISO178 method (1993). Test pieces cut out in four directions 0°, +45°, −45°, and 90° where an arbitrary direction was set to 0° direction were prepared, and the flexural strength and flexural modulus were measured at n=5 in each direction. The average values thereof were adopted as flexural strength σa and flexural modulus Ea. However, in case of substrate for reinforcement using continuous fibers, the substrate for reinforcement was piled up so as the fiber direction was aligned when preparing the test molded plate, and the fiber direction was set to 0° direction. As to a measuring apparatus, "INSTRON" (registered trademark) model 5565 universal material testing system (manufactured by INSTRON JAPAN Co., Ltd.) was used.

For a substrate for reinforcement with a thickness of 1 mm or more, using itself as a test molded plate (substrate for reinforcement), a test piece was cut out therefrom, and the flexural characteristics were measured according to the ISO178 method (1993). Test pieces cut out in four directions 0°, +45°, −45°, and 90° where an arbitrary direction was set to 0° direction were prepared, and the flexural strength and flexural modulus were measured at n=5 in each direction. The average values thereof were adopted as flexural strength σa and flexural modulus Ea.

(5) σaMax and σaMin of Flexural Strength of Substrate for Reinforcement and EaMax and EaMin of Flexural Modulus Of the flexural strength and flexural modulus in four directions 0°, +45°, −45°, and 90° measured according to the previous section, the maximum values were taken as σaMax, EaMax, and the minimum values were taken as σaMin, EaMin, respectively.

(6) Linear Expansion Coefficient Ca of Substrate for Reinforcement

For a substrate for reinforcement with a thickness of less than 1 mm, the substrate for reinforcement was piled up in a stamping molding mold having a box-shaped cavity with a thickness of 1.1 mm so that the thickness of the piled-up substrate for reinforcement had a thickness larger than the cavity thickness of the mold. Next, the mold was closed, pressurized at a molding pressure of 30 MPa and held for 2 minutes, and then the mold was opened and removed to prepare a test molded plate (substrate for reinforcement). A test piece was cut out from the test molded plate, and the linear expansion coefficient of the substrate for reinforcement was measured in accordance with ISO11359-2 (1999). As test pieces, test pieces cut out in four directions 0°, +45°, −45°, and 90° where an arbitrary direction was set to 0° direction were prepared, and the linear expansion coefficient was measured at n=5 in each direction. The average value thereof was adopted as linear expansion coefficient Ca. However, in case of substrate for reinforcement using continuous fibers, the substrate for reinforcement was piled up so as the fiber direction was aligned when preparing the test molded plate, and the fiber direction was set to 0° direction.

For a substrate for reinforcement with a thickness of 1 mm or more, using itself as a test molded plate (substrate for reinforcement), a test piece was cut out therefrom and measured in accordance with ISO11359-2 (1999). Test pieces cut out in four directions 0°, +45°, −45°, and 90° where an arbitrary direction was set to 0° direction were prepared, and the linear expansion coefficient was measured at n=5 in each direction. The average value thereof was adopted as linear expansion coefficient Ca.

(7) Linear Expansion Coefficient CaMax, CaMin of Substrate for Reinforcement

Of the linear expansion coefficients at 0°, +45°, −45°, and 90° measured according to the previous section, the maximum value was taken as CaMax and the minimum value was taken as CaMin.

(8) Determination of Flexural Strength of Substrate for Reinforcement

Determination was made according to the following criteria based on the flexural strength σa of the substrate for reinforcement.

A: Strength of 250 MPa or more
B: Strength of 200 MPa or more and less than 250 MPa
C: Strength of 150 MPa or more and less than 200 MPa
D: Strength of less than 150 MPa (9) Determination of Flexural Modulus of Substrate for Reinforcement Determination was made according to the following criteria based on the flexural modulus Ea of the substrate for reinforcement.

A: Elastic modulus of 15 GPa or more
B: Elastic modulus of 10 GPa or more and less than 15 GPa
C: Elastic modulus of 5 GPa or more and less than 10 GPa
D: Elastic modulus of less than 5 GPa.

(10) Determination of Linear Expansion Coefficient of Substrate for Reinforcement Determination was made according to the following criteria based on the linear expansion coefficient Ca of the substrate for reinforcement.

A: Linear expansion coefficient of $7 \times 10^{-6}$/K or less
B: Linear expansion coefficient of greater than $7 \times 10^{-6}$/K and $10 \times 10^{-6}$/K or less
C: Linear expansion coefficient of greater than $10 \times 10^{-6}$/K and $20 \times 10^{-6}$/K or less
D: Linear expansion coefficient of greater than $20 \times 10^{-6}$/K.

(11) Determination of Isotropy of Substrate for Reinforcement

Each characteristic of the flexural strength σa, the flexural modulus Ea, and the linear expansion coefficient Ca of the substrate for reinforcement was determined based on the in-plane variation.

A: The maximum value is 1.3 or less times the minimum value
B: The maximum value is greater than 1.3 times and 2 or less times the minimum value
C: The maximum value is greater than twice the minimum value.

(12) Flexural Strength σc, Flexural Modulus Ec of Integrally Molded Body

As shown in FIG. 2, a test piece was cut out from the integrally molded body, and the flexural characteristics were measured according to the ISO178 method (1993). The test piece was cut out so that the weldline part was located at the center. The number of measurements was n=5, and the average values were taken as flexural strength σc and flexural modulus Ec. As to a measuring apparatus, "INSTRON" (registered trademark) model 5565 universal material testing system (manufactured by INSTRON JAPAN Co., Ltd.) was used.

(13) Determination of Flexural Strength of Integrally Molded Body

Determination was made according to the following criteria based on the flexural strength σc of the integrally molded body measured according to the previous section.

A: Strength of 250 MPa or more
B: Strength of 200 MPa or more and less than 250 MPa
C: Strength of 150 MPa or more and less than 200 MPa
D: Strength of less than 150 MPa.

(14) Determination of Flexural Modulus of Integrally Molded Body

Determination was made according to the following criteria based on the flexural modulus Ec of the integrally molded body measured according to the pre-previous section.

A: Elastic modulus of 15 GPa or more
B: Elastic modulus of 10 GPa or more and less than 15 GPa
C: Elastic modulus of 5 GPa or more and less than 10 GPa
D: Elastic modulus of less than 5 GPa.

(15) Bonding Strength Between Substrate for Reinforcement and Injection Molding Body As shown in FIG. 2, a part where the substrate for reinforcement and the injection molding body were integrated was cut out as a test piece (FIG. 3 (a)). Next, an adhesive (ThreeBond 1782, manufactured by ThreeBond Co., Ltd.) was applied to a jig of a measuring apparatus as shown in FIG. 3 (b) and left at 23±5° C. and 50±5% RH for 4 hours, then the test piece was bonded and fixed. Next, a tensile test was performed at an atmospheric temperature of 25° C. At this point, before starting the test, a state where the test piece was not subjected to a tensile test load was maintained for at least 5 minutes, a thermocouple was arranged on the test piece, and it was confirmed that the temperature became equal to the atmospheric temperature; then a tensile test was performed. The tensile test was performed by pulling in the 90° direction from the bonding surface of both at a tensile speed of 1.27 mm/min, and a value obtained by dividing the maximum load by the bonding area was taken as the bonding strength (unit:MPa). The number of samples was n=5, and the average thereof was taken. As to a measuring apparatus, "INSTRON" (registered trademark) model 5565 universal material testing system (manufactured by INSTRON JAPAN Co., Ltd.) was used.

(16) Determination of Bonding Strength Between Substrate for Reinforcement and Injection Molding Body Determination was made according to the following criteria based on the bonding strength measured according to the previous section, and A and B were accepted.

A: Bonding strength of 10 MPa or more or destruction of injection molding body base material
B: Bonding strength of 7 MPa or more and less than 10 MPa
C: Bonding strength of less than 7 MPa.

(17) Thickness Variation of Substrate for Reinforcement in Integrally Molded Body As shown in FIG. 2, a part where the substrate for reinforcement and the injection molding body were integrated was cut out from the integrally molded body, embedded in an epoxy resin and then polished so that a cut surface was used as an observation surface as shown in FIG. 4 to prepare a test piece. The test piece was magnified 200 times with a laser microscope (VK-9510, manufactured by Keyence Corporation), and the thickness of the substrate for reinforcement was observed. The observation image was developed on a general-purpose image analysis software, and average thickness t1, maximum thickness t2 and minimum thickness t3 of the substrate for reinforcement visible in the observation image were measured using a program incorporated in the software. The thickness variation (%) of the substrate for reinforcement in the integrally molded body was calculated from the following equation. Here, as to the average thickness t1 of the substrate for reinforcement, the thickness was measured at each dividing point excluding both ends when the substrate for reinforcement cross section in the observation image was divided into 10 equal parts in the width direction, and the average value thereof was taken as the average thickness t1 of the substrate for reinforcement.

$$\text{Thickness variation (\%)} = ((t2 \text{ (mm)} - t3 \text{ (mm)})/t1 \text{ (mm)})/100.$$

(18) Determination of Thickness Variation of Substrate for Reinforcement in Integrally Molded Body Determination was made according to the following criteria based on the thickness variation of the substrate for reinforcement measured according to the previous section, and A and B were accepted.

A: Thickness variation of less than 5%
B: Thickness variation of 5% or more and 10% or less
C: Thickness variation of more than 10%.

(19) Measurement of Area Change Rate of Substrate for Reinforcement with Respect to Insert Area As shown in FIG. 1, area S1 of the substrate for reinforcement after the integration existing in the insert area S0 of the substrate for reinforcement with respect to the insert area S0 of the substrate for reinforcement was measured, whereby area change rate S of the substrate for reinforcement with respect to the insert areae was calculated by the following equation.

$$S \text{ (area \%)} = (|S1 - S0|/S0) \times 100$$

The insert area S0 of the substrate for reinforcement herein referred to is an area aiming at the integration of the injection molding body and the substrate for reinforcement, and is indicated by a thick frame in FIG. 1. When the substrate for reinforcement is buried in the resin for injection molding at the time of integration with the injection molding body or the position of the substrate for reinforcement is shifted from the insert area, the area change rate S of the substrate for reinforcement with respect to the insert area increases.

(20) Determination of Moldability of Integrally Molded Body

Determination was made according to the following criteria based on the area change rate S of the substrate for reinforcement measured according to the previous section.

A: The area change rate of the substrate for reinforcement is 3% or less
B: The area change rate of the substrate for reinforcement is larger than 3% and 5% or less
C: The area change rate of the substrate for reinforcement is larger than 5% and 10% or less
D: The area change rate of the substrate for reinforcement is larger than 10%.

(21) Area Ratio of Substrate for Reinforcement not in Contact with Mold when Substrate for Reinforcement was Laid Up in Mold Area ratio Sa of the substrate for reinforcement not in contact with a mold when the substrate for reinforcement was laid up in the mold was calculated by the following equation, as a ratio of an area excluding surface area Sc of the substrate for reinforcement actually stuck to the injection molding mold by injection molding from Sb, to surface area Sb of the side stuck to the injection molding mold, in the substrate for reinforcement at the time of insertion.

$$Sa\ (\%)=(|Sb-Sc|/Sb)\times 100$$

A: 0% or more and 2% or less
B: Greater than 2% and 5% or less
C: Greater than 5% and 20% or less
D: Greater than 20%.

(22) Area Ratio of Substrate for Reinforcement not in Contact with Injection Molding Body when Substrate for Reinforcement was Laid Up on Injection Molding Body Area ratio Sd of the substrate for reinforcement not in contact with the injection molding body when the substrate for reinforcement was laid up on the injection molding body was calculated by the following equation, as a ratio of an area excluding surface area Sf of an adhesion mark left on the injection molding body after peeling the substrate for reinforcement from the integrally molded body, from area Se of the substrate for reinforcement, to the area Se of the substrate for reinforcement.

$$Sd\ (\%)=(|Se-Sf|/Se)\times 100$$

A: 0% or more and 2% or less
B: Greater than 2% and 5% or less
C: Greater than 5% and 20% or less
D: Greater than 20%.

(23) Measurement of Difference in Fiber Orientation Angle

First, the orientation angle ($\alpha$) of the discontinuous fiber (a1) in each region was calculated.

That is, the surface of the integrated substrate for reinforcement was polished, and 100 fibers were randomly selected in each of the regions obtained by dividing the major axis direction into 10 equal parts. The fibers on the polished surface were generally confirmed by an elliptical shape, and the major axis direction of the ellipse was taken as the fiber orientation direction. Using the direction of the weldline of the injection molding body as the reference of the angle, all angles formed by the orientation direction of the selected fibers with respect to the direction of the weldline (hereinafter, abbreviated as orientation angles $\alpha i$) were measured. Using the orientation angles $\alpha i$, the orientation angle ($\alpha$) of the discontinuous fiber (a1) in each region was calculated by the following equation.

$$\alpha=\Sigma(\alpha i)/100$$

$\alpha i$: Measured orientation angles (i=1, 2, 3, . . . , 100)

Then, the maximum value ($\alpha max$) and the minimum value ($\alpha min$) were identified from the values of "the orientation angles ($\alpha$) of the discontinuous fiber (a1)" in 10 regions, and a difference in the orientation angle was calculated from them as follows.

$$\text{Difference (°) in orientation angle } (\alpha)=\alpha max-\alpha min$$

$\alpha max$: Maximum value of orientation angles ($\alpha$) measured in each of regions obtained by dividing major axis direction of substrate for reinforcement (a) into 10 equal parts $\alpha min$: Minimum value of orientation angles ($\alpha$) calculated in each of regions obtained by dividing major axis direction of substrate for reinforcement (a) into 10 equal parts.

(24) Determination of Difference in Fiber Orientation Angle ($\alpha$)

Determination was made according to the following criteria based on the difference in fiber orientation angle ($\alpha$) measured according to the previous section.

A: Difference in orientation angle ($\alpha$) of 10° or less
B: Difference in orientation angle ($\alpha$) of greater than 10° and 15° or less
C: Difference in orientation angle ($\alpha$) of greater than 15° and 20° or less
D: Difference in orientation angle ($\alpha$) of greater than 20.

[Carbon Fibers 1]

A copolymer with polyacrylonitrile as a main component was subjected to spun processing, calcined processing, and surface oxidation treatment to obtain continuous carbon fibers with a total single yarn number of 12,000. The properties of the continuous carbon fibers were as follows.
Single filament diameter: 7 μm
Specific gravity: 1.8
Tensile strength: 4600 MPa
Tensile modulus: 220 GPa

[Carbon Fibers 2]

A copolymer with polyacrylonitrile as a main component was subjected to spun processing, calcined processing, and surface oxidation treatment to obtain continuous carbon fibers with a total single yarn number of 12,000. The properties of the continuous carbon fibers were as follows.
Single filament diameter: 7 μm
Specific gravity: 1.8
Tensile strength: 4100 MPa
Tensile modulus: 420 GPa

[Carbon Fibers 3]
Toray Industries, Inc., TORAYCA T800SC-24000
Single filament diameter: 5 μm
Specific gravity: 1.8
Tensile strength: 5880 MPa
Tensile modulus: 294 GPa

[Glass fibers]
Product name PF-E001, manufactured by Nitto Boseki Co., Ltd.

[Substrate for Reinforcement 1]

Carbon Fiber 1 was cut into 6 mm with a strand cutter to obtain chopped carbon fibers. A dispersion with a concentration of 0.1% by mass containing water and a surfactant (polyoxyethylene lauryl ether (product name) manufactured by Nacalai Tesque, Inc.) was prepared. Using this dispersion and the chopped carbon fibers, a paper-making substrate was manufactured using an apparatus for manufacturing a paper-making substrate. The manufacturing apparatus includes a paper-making tank, a cylindrical vessel with a diameter of 1,000 mm having an opening cock at the lower part of the vessel as a dispersing tank and a linear transportation unit (an inclination angle of 30°) connecting the dispersing tank and a paper-making tank. A stirrer is attached to an opening at the top surface of the dispersing tank, and the chopped carbon fibers and the dispersion (dispersion medium) can be charged from the opening. The paper-making tank includes a mesh conveyor having a paper-making face with a width of 500 mm on its bottom, and a conveyor that can convey a carbon fiber substrate (a paper-making substrate) is connected to the mesh conveyor. Paper-making was performed with a carbon fiber concentration in the dispersion of 0.05% by mass. The carbon fiber substrate obtained by paper-making was dried in a drying furnace at 200° C. for 30 minutes. The obtained carbon fiber substrate had a width of 500 mm, a length of 500 mm, and a weight per unit area of 50 g/m$^2$.

One sheet of carbon fiber substrate mentioned above and two sheets of film with the same thickness of each film of CM1007 (nylon 6 resin) manufactured by Toray Industries, Inc. were piled up as film/carbon fiber substrate/film, and the piled up laminate was applied with a pressure of 5 MPa at a temperature of 250° C. for 2 minutes by press molding to prepare substrate for reinforcement 1 in which the carbon fiber substrate was impregnated with the nylon 6. The properties of the substrate for reinforcement are shown in Table 1-1.

[Substrate for Reinforcement 2]

Substrate for reinforcement 2 was prepared in the same manner as the substrate for reinforcement 1 except that the basis weight of the nylon 6 resin film to be impregnated in the carbon fiber substrate was adjusted so that the fiber mass content was 52%. The properties of the substrate for reinforcement are shown in Table 1-1. Since the fiber mass content increased, the substrate had high elastic modulus.

[Substrate for Reinforcement 3]

Substrate for reinforcement 3 was prepared in the same manner as the substrate for reinforcement 1 except that the basis weight of the nylon 6 resin film to be impregnated in the carbon fiber substrate was adjusted so that the fiber mass content was 15%. The properties of the substrate for reinforcement are shown in Table 1-1. Since the fiber mass content decreased, the substrate had low elastic modulus and a large linear expansion coefficient.

[Substrate for Reinforcement 4]

The carbon fiber substrate of the substrate for reinforcement 1 and two sheets of film with the same thickness of each film of A900 (PPS resin) manufactured by Toray Industries, Inc. were used to be piled up as film/carbon fiber substrate/film, and the piled-up laminate was applied with a pressure of 5 MPa at a temperature of 300° C. for 2 minutes by press molding to prepare substrate for reinforcement 4 in which the carbon fiber substrate was impregnated with the PPS resin. The properties of the substrate for reinforcement are shown in Table 1-1.

[Substrate for Reinforcement 5]

The carbon fiber substrate of the substrate for reinforcement 1, and two sheets of film with the same thickness of each film prepared from a resin obtained by kneading 50% by mass of an unmodified polypropylene resin ("Prime Polypro" J105G manufactured by Prime Polymer Co., Ltd.) and 50% by mass of an acid-modified polypropylene resin ("Admer" QB510 manufactured by Mitsui Chemicals, Inc.) were used to be piled up as film/carbon fiber substrate/film, and the piled-up laminate was applied with a pressure of 5 MPa at a temperature of 230° C. for 2 minutes by press molding to prepare substrate for reinforcement 5 in which the carbon fiber substrate was impregnated with the PP resin. The properties of the substrate for reinforcement are shown in Table 1-1.

[Substrate for Reinforcement 6]

Substrate for reinforcement 6 was obtained in the same manner as the substrate for reinforcement 1 except that chopped glass fibers in which glass fibers were cut into 6 mm with a cartridge cutter were used instead of the chopped carbon fibers. The properties of the substrate for reinforcement are shown in Table 1-2. Since the glass fibers were used as the reinforcement fibers, the substrate had low strength and elastic modulus and a large linear expansion coefficient.

[Substrate for Reinforcement 7]

Substrate for reinforcement 7 was prepared in the same manner as the substrate for reinforcement 2 except that chopped carbon fibers obtained by cutting the carbon fibers 2 into 6 mm with a cartridge cutter were used instead of the chopped carbon fibers 1. The properties of the substrate for reinforcement are shown in Table 1-2. Since fibers having high elastic modulus were used, the substrate had high elastic modulus.

[Substrate for Reinforcement 8]

A carbon fiber substrate obtained by widening the carbon fibers 3 extending in one direction, and two sheets of nylon 6 resin film with the same thickness of each film of which use amount had been adjusted to have a fiber mass content of 60% were piled up as film/carbon fiber substrate/film, and the piled up laminate was applied with a pressure of 5 MPa at a temperature of 250° C. for 2 minutes by press molding to prepare substrate for reinforcement 8 in which the continuous carbon fibers arranged in one direction were impregnated with the nylon 6 resin. The properties of the substrate for reinforcement are shown in Table 1-2. Since the fibers were continuous in one direction, the substrate had anisotropy in properties.

[Substrate for Reinforcement 9]

Substrate for reinforcement 9 was prepared in the same manner as the substrate for reinforcement 1 except that, when piling up carbon fiber substrates and resin films, three sheets of carbon fiber substrate and six sheets of nylon 6 resin film with the same thickness of each film were piled up as film/carbon fiber substrate/film/film/carbon fiber substrate/film/film/carbon fiber substrate/film from the bottom. The properties of the substrate for reinforcement are shown in Table 1-2. Since the number of piled-up laminated layers was increased, a thick substrate was obtained.

[Substrate for Reinforcement 10]

As a pre-shaped substrate, three sheets of substrates for reinforcement 8 were piled up, and heated and fused at 250° C. at 5 MPa for 2 minutes by press molding to prepare substrate for reinforcement 10. The properties of the substrate for reinforcement are shown in Table 1-2. Since the fibers were continuous in one direction, the substrate had anisotropy in properties.

[Substrate for Reinforcement 11]

As a pre-shaped substrate, two sheets of substrates for reinforcement 2 were piled up, and heated and fused at 250° C. at 5 MPa for 2 minutes by press molding to prepare substrate for reinforcement 11. The properties of the substrate for reinforcement are shown in Table 1-2.

[Resin for Injection Molding 1]

TLP1060 (long fiber carbon fibers/nylon resin) manufactured by Toray Industries, Inc.

[Resin for Injection Molding 2]

A630T-30V (short fiber carbon fibers/PPS resin) manufactured by Toray Industries, Inc.

[Resin for Injection Molding 3]

TLP8169 (long fiber carbon fibers/PP resin) manufactured by Toray Industries, Inc.

[Resin for Injection Molding 4]

CM1007 (non-reinforced nylon resin) manufactured by Toray Industries, Inc.

Example 1

The substrate for reinforcement 1 was cut into 150 mm×30 mm. The cut substrate for reinforcement was inserted into a central part of the injection molding mold having a cavity of 150 mm length×150 mm width×1 mm thickness, in which a weldline was considered to be generated, so that the substrate for reinforcement covered along the weldline after the integration. The resin for injection molding 1 was injected to a mold at a cylinder temperature of 260° C. and a mold temperature of 80° C. to prepare an integrally molded body in which the substrate for reinforcement and the injection molding body were integrated. The substrate for reinforcement 1 was integrated with the injection molding body over a distance of 30 mm in the width direction of the weldline of the injection molding body. In the obtained integrally molded body, no twisting of the substrate for reinforcement was observed, and a molded body with high quality was prepared. Moreover, the thickness variation of the substrate for reinforcement was small, and a molded body having excellent bonding strength between the substrate for reinforcement and the injection molding body was produced. Furthermore, the mechanical characteristics of the weldline part of the obtained integrally molded body were excellent. The obtained integrally molded body had a form as shown in FIG. 2. The evaluation results of the integrally molded body are shown in Table 2-1.

Example 2

An integrally molded body was prepared in the same manner as in Example 1 except that the substrate for reinforcement 2 was used instead of the substrate for reinforcement 1. The evaluation results of the integrally molded body are shown in Table 2-1. In the substrate for reinforcement of the obtained integrally molded body, no twisting of the substrate for reinforcement was observed, and a molded body with high quality was prepared. In addition, since the thickness of the substrate for reinforcement 2 was small, the flow of the resin for injection molding was not prevented and the thickness variation of the substrate for reinforcement in the integrally molded body was also small, and a molded body having excellent bonding strength between the substrate for reinforcement and the injection molding body was prepared. Furthermore, the mechanical characteristics of the weldline part of the integrally molded body were excellent.

Example 3

An integrally molded body was prepared in the same manner as in Example 1 except that the substrate for reinforcement 3 was used instead of the substrate for reinforcement 1. The evaluation results of the integrally molded body are shown in Table 2-1. In the substrate for reinforcement of the obtained integrally molded body, no twisting of the substrate for reinforcement was observed, and a molded body with high quality was prepared. In addition, since the elastic modulus of the substrate for reinforcement 3 was low, the elastic modulus of the weldline part of the integrally molded body was low, but the thickness variation of the substrate for reinforcement in the integrally molded body was small, and a molded body having excellent bonding strength between the substrate for reinforcement and the injection molding body was prepared.

Example 4

An integrally molded body was prepared in the same manner as in Example 1 except for using the substrate for reinforcement 4 instead of the substrate for reinforcement 1, and the resin for injection molding 2 instead of the resin for injection molding 1, and changing the cylinder temperature during injection molding to 330° C., and the mold temperature to 150° C. The evaluation results of the integrally molded body are shown in Table 2-1. In the obtained integrally molded body, no twisting of the substrate for reinforcement was observed, and a molded body with high quality was prepared. Further, since the resin of the substrate for reinforcement and the resin for injection molding were PPS resins, a dimensional change of the substrate for reinforcement 4 during lay-up in the injection molding mold was small and the thickness variation of the substrate for reinforcement in the integrally molded body was also small, and a molded body having excellent bonding strength between the substrate for reinforcement and the injection molding body was prepared. Furthermore, the mechanical characteristics of the weldline part of the integrally molded body were excellent.

Example 5

An integrally molded body was prepared in the same manner as in Example 1 except for using the substrate for reinforcement 5 instead of the substrate for reinforcement 1, and the resin for injection molding 3 instead of the resin for injection molding 1, and changing the cylinder temperature during injection molding to 230° C., and the mold temperature to 60° C. The evaluation results of the integrally molded body are shown in Table 2-1. In the obtained integrally molded body, no twisting of the substrate for reinforcement was observed, and a molded body with high quality was prepared. In addition, although since the resin of the substrate for reinforcement and the resin for injection molding were PP resins, the thickness variation of the substrate for reinforcement was small in the obtained integrally molded body, and a molded body having excellent bonding strength between the substrate for reinforcement and the injection molding body was prepared. Furthermore, the mechanical characteristics of the weldline part of the integrally molded body were excellent.

Example 6

An integrally molded body was prepared in the same manner as in Example 1 except that the substrate for reinforcement 6 was used instead of the substrate for reinforcement 1. The evaluation results of the integrally molded body are shown in Table 2-1. Since the reinforcement fibers used for the substrate for reinforcement were glass fibers, the mechanical characteristics of the weldline part in the obtained integrally molded body were low, but no twisting of the substrate for reinforcement was observed in the integrally molded body, and a molded body with high quality was prepared. Moreover, the thickness variation of the substrate for reinforcement was small, and a molded body having excellent bonding strength between the substrate for reinforcement and the injection molding body was produced.

Example 7

An integrally molded body was prepared in the same manner as in Example 1 except that the substrate for reinforcement 7 was used instead of the substrate for reinforcement 1. The evaluation results of the integrally molded body are shown in Table 2-1. In the obtained integrally molded body, no twisting of the substrate for reinforcement was observed, and a molded body with high quality was prepared. Further, since carbon fibers having high elastic modulus were used as the reinforcement fibers (discontinuous fibers) of the substrate for reinforcement, the mechanical characteristics of the weldline part in the integrally molded body were excellent. Furthermore, the thickness variation of the substrate for reinforcement in the integrally molded body was small, and a molded body having excellent bonding strength between the substrate for reinforcement and the injection molding body was prepared.

Comparative Example 1

An injection molding body was prepared in the same manner as in Example 1 except that the substrate for reinforcement was not inserted. The evaluation results of the injection molding body are shown in Table 2-2. Although the mechanical characteristics of the fiber reinforced resin used as an injection material were excellent, the mechanical characteristics of the weldline part not reinforced by the substrate for reinforcement were very low.

Comparative Example 2

An injection molding body was prepared in the same manner as in Example 1 except that the substrate for reinforcement was not inserted and the resin for injection molding 4 was used instead of the resin for injection molding 1. The evaluation results of the injection molding body are shown in Table 2-2. Even a non-reinforced resin was used as the injection material, the mechanical characteristics of the weldline part not reinforced by the substrate for reinforcement were very low.

Comparative Example 3

An integrally molded body was prepared in the same manner as in Example 1 except that the substrate for reinforcement 8 was used instead of the substrate for reinforcement 1. The evaluation results of the integrally molded body are shown in Table 2-2. However, the substrate for reinforcement was cut so that the longitudinal direction of the substrate for reinforcement was the fiber direction. The substrate for reinforcement used continuous carbon fibers arranged in one direction as reinforcement fibers, but the substrate for reinforcement fibers lined up along the weldline, so that the reinforcing effect was not be obtained at the weldline part, and the mechanical characteristics were equivalent to those of the injection molding body in which weldline was not reinforced. Further, since the substrate for reinforcement 8 had a large linear expansion coefficient in the direction perpendicular to the fiber direction, low flexural modulus, and anisotropy, a dimensional change of the substrate for reinforcement when laid up in the mold and heated was large; as a result, the area of the substrate not in contact with the mold was increased. In the obtained integrally molded body, twisting of the substrate for reinforcement was large and the fibers themselves of the substrate for reinforcement were also disturbed, and the molded body had a low quality. Furthermore, the thickness variation of the substrate for reinforcement in the integrally molded body was also large.

Comparative Example 4

It was attempted to prepare an integrally molded body in the same manner as in Example 1 except that the substrate for reinforcement 9 was used instead of the substrate for reinforcement 1. However, the thickness of the substrate for reinforcement 9 was thick, the resin for injection molding did not flow to the center of the cavity and was unfilled, and an integrally molded body was not obtained.

Comparative Example 5

It was attempted to prepare an integrally molded body in the same manner as in Example 1 except that the substrate for reinforcement 10 was used instead of the substrate for reinforcement 1. However, since the substrate for reinforcement 10 had anisotropy, a dimensional change of the substrate for reinforcement was large when laid up in the mold and heated, and the area not in contact with the mold was increased. In addition, the thickness of the substrate for reinforcement 10 was thick, the resin for injection molding did not flow to the center of the cavity and was unfilled, and an integrally molded body was not obtained.

Example 8

An integrally molded body was prepared in the same manner as in Example 1 except that the substrate for reinforcement 1 was cut into 150 mm×15 mm. The evaluation results of the integrally molded body are shown in Table 3-1. Even the width of the substrate for reinforcement was reduced, a molded body with good quality, thickness variation, bonding strength, and mechanical characteristics of the weldline part was prepared as in Example 1.

Example 9

An integrally molded body was prepared in the same manner as in Example 2 except that the substrate for reinforcement 2 was cut into 150 mm×15 mm. The evaluation results of the integrally molded body are shown in Table 3-1. Even the width of the substrate for reinforcement was reduced, a molded body with good quality, thickness variation, bonding strength, and mechanical characteristics of the weldline part was prepared as in Example 2. The amount of the inserted substrate for reinforcement was reduced, and the integrally molded body was excellent also from the viewpoint of achieving both reinforcement of the weldline and weight reduction.

Example 10

An integrally molded body was prepared in the same manner as in Example 3 except that the substrate for reinforcement 3 was cut into 150 mm×15 mm. The evaluation results of the integrally molded body are shown in Table 3-1. The substrate for reinforcement 3 had low flexural modulus and a large linear expansion coefficient, so that when the width of the substrate for reinforcement was reduced, some twisting and thickness variation were observed in the reinforcement substrate after the integration as compared to Example 3. In addition, some deterioration in bonding strength was also observed.

Example 11

An integrally molded body was prepared in the same manner as in Example 4 except that the substrate for reinforcement 4 was cut into 150 mm×15 mm. The evaluation results of the integrally molded body are shown in Table 3-1. Even the width of the substrate for reinforcement was reduced, a dimensional change of the substrate for reinforcement 4 during injection molding was small, and a molded body with good quality, thickness variation, bonding strength, and mechanical characteristics of the weldline part was prepared as in Example 4.

Example 12

An integrally molded body was prepared in the same manner as in Example 5 except that the substrate for reinforcement 5 was cut into 150 mm×15 mm. The evaluation results of the integrally molded body are shown in Table 3-1. Even the width of the substrate for reinforcement was reduced, a molded body with good quality, thickness variation, bonding strength, and mechanical characteristics of the weldline part was prepared as in Example 5.

Example 13

An integrally molded body was prepared in the same manner as in Example 7 except that the substrate for reinforcement 7 was cut into 150 mm×15 mm. The evaluation results of the integrally molded body are shown in Table 3-1. Even the width of the substrate for reinforcement was reduced, a molded body with good quality, thickness variation, bonding strength, and mechanical characteristics of the weldline part was prepared as in Example 7. The amount of the inserted substrate for reinforcement was reduced, and it could be said to be an excellent integrally molded body also from the viewpoint of achieving both reinforcement of weld and weight reduction.

Example 14

An integrally molded body was prepared in the same manner as in Example 6 except that the substrate for reinforcement 6 was cut into 150 mm×15 mm. The evaluation results of the integrally molded body are shown in Table 3-2. The substrate for reinforcement 6 had low mechanical characteristics and a large linear expansion coefficient, so that when the width of the substrate for reinforcement was reduced, the thickness variation was observed in the reinforcement substrate after the integration. In addition, some deterioration in bonding strength was observed.

Comparative Example 6

An integrally molded body was prepared in the same manner as in Comparative Example 3 except that the substrate for reinforcement 8 was cut into 150 mm×15 mm. The evaluation results of the integrally molded body are shown in Table 3-2. When the width of the substrate for reinforcement was reduced, twisting was observed in the substrate for reinforcement after the integration. In addition, the thickness variation of the substrate for reinforcement was increased, and deterioration in bonding strength was observed.

Comparative Example 7

It was attempted to prepare an integrally molded body in the same manner as in Comparative Example 4 except that the substrate for reinforcement 9 was cut into 150 mm×15 mm. However, as in Comparative Example 4, the thickness of the substrate for reinforcement was thick, the resin for injection molding did not flow to the center of the cavity, thus the resin for injection molding was unfilled, and an integrally molded body was not obtained.

Example 15

An integrally molded body was prepared in the same manner as in Example 1 except that the substrate for reinforcement 11 was used instead of the substrate for reinforcement 1. The evaluation results of the integrally molded body are shown in Table 3-2. Since the substrate for reinforcement 2 was heat-molded by pre-shaping, the flow of the resin for injection molding as the substrate for reinforcement 11 was not prevented, and the obtained integrally molded body had good quality without twisting of the substrate for reinforcement. Moreover, although some thickness variation of the substrate for reinforcement occurred at the time of pre-shaping, a molded body having excellent bonding strength between the substrate for reinforcement and the injection molding body was prepared. Furthermore, the mechanical characteristics of the weldline part of the integrally molded body were excellent.

Example 16

An integrally molded body was prepared in the same manner as in Example 11 except that the substrate for reinforcement 15 was cut into 150 mm×15 mm. The evaluation results of the integrally molded body are shown in Table 3-2. Since the substrate for reinforcement 2 was heat-molded by pre-shaping, the flow of the resin for injection molding as the substrate for reinforcement 11 was not prevented, and the obtained integrally molded body had good quality without twisting of the substrate for reinforcement. Moreover, although some thickness variation of the substrate for reinforcement occurred at the time of pre-shaping, a molded body having excellent bonding strength between the substrate for reinforcement and the injection molding body was prepared. Furthermore, the mechanical characteristics of the weldline part of the integrally molded body were excellent.

Example 17

Figure 5:
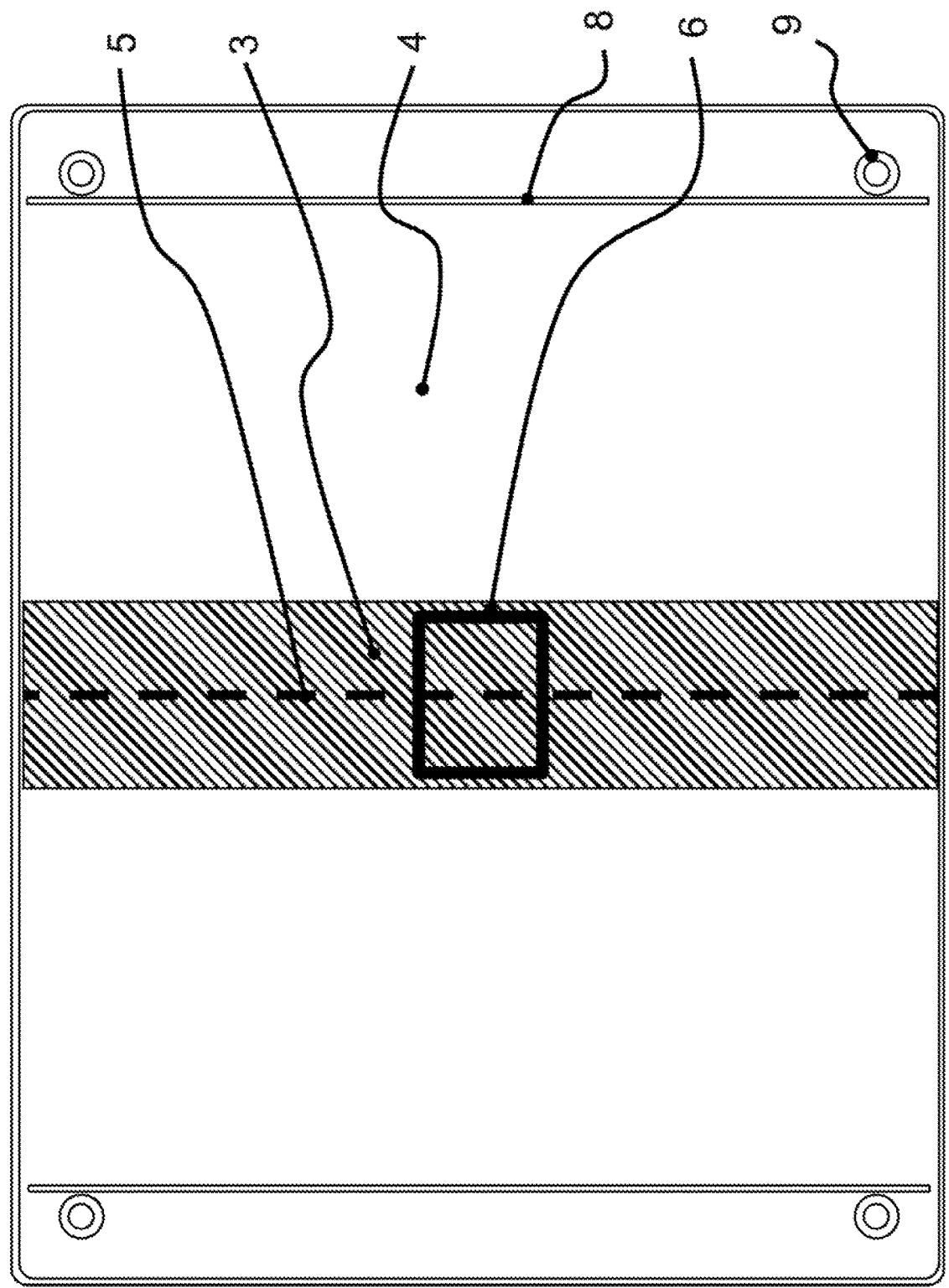
FIG. 5 is a schematic diagram showing a test piece cut-out position in an integrally molded body obtained in Example 17.

A box-type injection molding mold consisting of a flat plate part of 150 mm length×190 mm width×1 mm thickness, and a 10 mm tall standing wall (R=2.5) with bosses and ribs was prepared, and the substrate for reinforcement 1 was cut into 170 mm×30 mm. The cut substrate for reinforcement was heated with a heater and inserted into a position in which a weldline in the cavity of the box-type injection molding mold was considered to be generated, and the resin for injection molding 1 was injected to a mold at a cylinder temperature of 260° C. and a mold temperature of 80° C. to prepare an integrally molded body in which the substrate for reinforcement and the injection molding body were integrated. The substrate for reinforcement 1 was excellent in shaping properties and integrated with the injection molding body up to the standing wall portion over a distance of 30 mm in the width direction of the weldline of the injection molding body. In the obtained integrally molded body, the thickness variation of the substrate for reinforcement was small, no twisting of the substrate for reinforcement was observed, and a molded body with high quality was prepared. Furthermore, the molded body was excellent also in the bonding strength between the substrate for reinforcement and the injection molding body. Moreover, the mechanical characteristics of the weldline part of the integrally molded body were also excellent. A schematic diagram of the obtained integrally molded body is shown in FIG. 5. The evaluation results of the integrally molded body are shown in Table 3-2.

Comparative Example 8

An integrally molded body was prepared in the same manner as in Example 17 except that the substrate for reinforcement 8 was used instead of the substrate for reinforcement 1. The evaluation results of the integrally molded body are shown in Table 3-2. The substrate for reinforcement 8 had anisotropy, and when heated with a heater, the substrate for reinforcement twisted and it was difficult to lay up along the mold. Even in the integrally molded body, major twisting was observed in the substrate for reinforcement, and the thickness variation was also large.

Example 18

First, the resin for injection molding 1 was injected to a mold using an injection molding mold having a cavity of 150 mm length×150 mm width×1 mm thickness to obtain an injection molding body having a weldline at the central part. Thereafter, the substrate for reinforcement 1 cut into 150 mm×30 mm was heated with a heater and integrated along the weldline of the injection molding body to prepare an integrally molded body in which the substrate for reinforcement and the injection molding body were integrated. The substrate for reinforcement 1 was integrated with the injection molding body over a distance of 30 mm in the width direction of the weldline of the injection molding body. In the obtained integrally molded body, no twisting of the substrate for reinforcement was observed, the thickness variation of the substrate for reinforcement was also small, and a molded body having excellent bonding strength between the substrate for reinforcement and the injection molding body was prepared. Moreover, the mechanical characteristics of the weldline part of the integrally molded body were excellent. The evaluation results of the integrally molded body are shown in Table 4.

Example 19

First, a box-type injection molding mold consisting of a flat plate part of 150 mm length×190 mm width×1 mm thickness, and a 10 mm tall standing wall (R=2.5) with bosses and ribs was prepared. The resin for injection molding 1 was injected to a mold using the box-type injection molding mold to obtain a box-type injection molding body having a weldline at the central part. Thereafter, the substrate for reinforcement 1 cut into 170 mm×30 mm was heated with a heater and integrated along the weldline of the injection molding body to prepare an integrally molded body in which the substrate for reinforcement and the injection molding body were integrated. The substrate for reinforcement 1 was excellent in shaping properties and integrated with the injection molding body up to the standing wall portion over a distance of 30 mm in the width direction of the weldline of the injection molding body. In the obtained integrally molded body, no twisting of the substrate for reinforcement was observed, the thickness variation of the substrate for reinforcement was also small, and a molded body having excellent bonding strength between the substrate for reinforcement and the injection molding body was prepared. Moreover, the mechanical characteristics of the weldline part of the integrally molded body were excellent. The evaluation results of the integrally molded body are shown in Table 4.

Comparative Example 9

An integrally molded body was prepared in the same manner as in Example 18 except that the substrate for reinforcement 8 was used instead of the substrate for reinforcement 1. The substrate for reinforcement 8 had anisotropy, and when heated with a heater, the substrate for reinforcement twisted and it was difficult to lay up along the weldline of the injection molding body.

Comparative Example 10

An integrally molded body was prepared in the same manner as in Example 19 except that the substrate for reinforcement 8 was used instead of the substrate for reinforcement 1. The substrate for reinforcement 8 had anisotropy, and when heated with a heater, the substrate for reinforcement twisted and it was difficult to lay up along the weldline of the injection molding body. In addition, shaping properties of the substrate for reinforcement 8 were low, and there was a part where the substrate for reinforcement and the injection molding body were not integrated in an R part of the standing wall of the box-type injection molding body.

TABLE 1-1

|  |  |  |  |  | Substrate for reinforcement 1 | Substrate for reinforcement 2 | Substrate for reinforcement 3 | Substrate for reinforcement 4 | Substrate for reinforcement 5 |
|---|---|---|---|---|---|---|---|---|---|
| Substrate for reinforcement | Reinforcement fibers | Fiber type |  | [—] | [Carbon Fibers 1] | [Carbon Fibers 1] | [Carbon Fibers 1] | [Carbon Fibers 1] | [Carbon Fibers 1] |
|  |  | Fiber mass content |  | [wt %] | 28 | 52 | 15 | 25 | 33 |
|  |  | Fiber length ratio | >10 mm | [wt %] | 0 | 0 | 0 | 0 | 0 |
|  |  |  | 2 to 10 mm | [wt %] | 95 | 95 | 95 | 95 | 95 |
|  |  |  | <2 mm | [wt %] | 5 | 5 | 5 | 5 | 5 |

TABLE 1-1-continued

|  |  |  |  | Substrate for reinforcement 1 | Substrate for reinforcement 2 | Substrate for reinforcement 3 | Substrate for reinforcement 4 | Substrate for reinforcement 5 |
|---|---|---|---|---|---|---|---|---|
| Resin | Resin type |  | [—] | Nylon 6 | Nylon 6 | Nylon 6 | PPS | PP |
|  | Resin mass content |  | [wt %] | 72 | 48 | 85 | 75 | 67 |
| Features | Thickness |  | [mm] | 0.15 | 0.07 | 0.25 | 0.15 | 0.15 |
|  | Bulk density |  | [g/cm$^3$] | 1.2 | 1.33 | 1.19 | 1.37 | 1.03 |
|  | Basis weight |  | [g/m$^2$] | 180 | 100 | 330 | 200 | 150 |
| Properties | Flexural strength | σaMax | [—] | A | A | A | A | A |
|  |  | σaMin |  | A | A | A | A | A |
|  | Isotropy |  | [—] | A | A | A | A | A |
|  | Flexural modulus | EaMax | [—] | A | A | B | A | A |
|  |  | EaMin |  | A | A | B | A | A |
|  | Isotropy |  | [—] | A | A | A | A | A |
|  | Linear expansion coefficient | CaMax | [—] | A | A | C | A | A |
|  |  | CaMin |  | A | A | C | A | A |
|  | Isotropy |  | [—] | A | A | A | A | A |

TABLE 1-2

|  |  |  |  |  | Substrate for reinforcement 6 | Substrate for reinforcement 7 | Substrate for reinforcement 8 | Substrate for reinforcement 9 | Substrate for reinforcement 10 | Substrate for reinforcement 11 |
|---|---|---|---|---|---|---|---|---|---|---|
| Substrate for reinforcement | Reinforcement fibers | Fiber type |  | [—] | Glass fibers | [Carbon Fibers 2] | [Carbon Fibers 3] | [Carbon Fibers 1] | [Carbon Fibers 3] | [Carbon Fibers 1] |
|  |  | Fiber mass content |  | [wt %] | 36 | 52 | 60 | 28 | 60 | 52 |
|  |  | Fiber length ratio | >10 mm | [wt %] | 0 | 0 | 100 | 0 | 100 | 0 |
|  |  |  | 2 to 10 mm | [wt %] | 95 | 95 | 0 | 95 | 0 | 95 |
|  |  |  | <2 mm | [wt %] | 5 | 5 | 0 | 5 | 0 | 5 |
|  | Resin | Resin type |  | [—] | Nylon 6 | Nylon 6 | Nylon 6 | Nylon 6 | Nylon 6 | Nylon 6 |
|  |  | Resin mass content |  | [wt %] | 64 | 48 | 40 | 72 | 40 | 48 |
|  | Features | Thickness |  | [mm] | 0.21 | 0.07 | 0.15 | 0.45 | 0.45 | 0.14 |
|  |  | Bulk density |  | [g/cm$^3$] | 1.33 | 1.33 | 1.41 | 1.2 | 1.41 | 1.33 |
|  |  | Basis weight |  | [g/m$^2$] | 280 | 100 | 210 | 540 | 630 | 200 |
|  | Properties | Flexural strength | σaMax | [—] | B | A | A | A | A | A |
|  |  |  | σaMin |  | B | A | D | A | D | A |
|  |  | Isotropy |  | [—] | A | A | D | A | D | A |
|  |  | Flexural modulus | EaMax | [—] | B | A | A | A | A | A |
|  |  |  | EaMin |  | B | A | C | A | C | A |
|  |  | Isotropy |  | [—] | A | A | D | A | D | A |
|  |  | Linear expansion coefficient | CaMax | [—] | C | A | D | A | D | A |
|  |  |  | CaMin |  | C | A | A | A | A | A |
|  |  | Isotropy |  | [—] | A | A | D | A | D | A |

TABLE 2-1

|  |  |  |  | Example 1 | Example 2 | Example 3 | Example 4 | Example 5 | Example 6 | Example 7 |
|---|---|---|---|---|---|---|---|---|---|---|
| Integrally molded body | Substrate for reinforcement | Type | [—] | Substrate for reinforcement 1 | Substrate for reinforcement 2 | Substrate for reinforcement 3 | Substrate for reinforcement 4 | Substrate for reinforcement 5 | Substrate for reinforcement 6 | Substrate for reinforcement 7 |
|  |  | Width | [mm] | 30 | 30 | 30 | 30 | 30 | 30 | 30 |
|  | Resin for injection molding | Type | [—] | Resin for injection molding 1 | Resin for injection molding 1 | Resin for injection molding 1 | Resin for injection molding 2 | Resin for injection molding 3 | Resin for injection molding 1 | Resin for injection molding 1 |
|  | Features | Bonding strength | [—] | A | A | A | A | A | A | A |
|  |  | Thickness variation | [—] | A | A | A | A | A | A | A |
|  |  | Moldability | [—] | A | A | A | A | A | A | A |
|  |  | Substrate area not in contact with mold reinforcement was laid up in mold | [—] | B | B | B | A | B | B | B |
|  |  | Difference in fiber orientation angle | [—] | A | A | A | A | A | A | A |

TABLE 2-1-continued

|  |  |  |  | Example 1 | Example 2 | Example 3 | Example 4 | Example 5 | Example 6 | Example 7 |
|---|---|---|---|---|---|---|---|---|---|---|
|  | Properties | Flexural strength σc | [—] | A | A | A | A | A | B | A |
|  |  | Flexural modulus Ec | [—] | A | A | B | A | A | B | A |

TABLE 2-2

|  |  |  |  | Comparative Example 1 | Comparative Example 2 | Comparative Example 3 | Comparative Example 4 | Comparative Example 5 |
|---|---|---|---|---|---|---|---|---|
| Integrally molded body | Substrate for reinforcement | Type | [—] | — | — | Substrate for reinforcement 8 | Substrate for reinforcement 9 | Substrate for reinforcement 10 |
|  |  | Width | [mm] | — | — | 30 | 30 | 30 |
|  | Resin for injection molding | Type | [—] | Resin for injection molding 1 | Resin for injection molding 4 | Resin for injection molding 1 | Resin for injection molding 1 | Resin for injection molding 1 |
|  | features | Bonding strength | [—] | — | — | B | — | — |
|  |  | Thickness variation | [—] | — | — | C | — | — |
|  |  | Moldability | [—] | — | — | C | — | — |
|  |  | Substrate area not in contact with mold when substrate for reinforcement was laid up in mold | [—] | — | — | C | B | D |
|  |  | Difference in fiber orientation angle | [—] | — | — | C | — | — |
|  | Properties | Flexural strength σc | [—] | D | D | D | — | — |
|  |  | Flexural modulus Ec | [—] | C | D | C | — | — |

TABLE 3-1

|  |  |  |  | Example 8 | Example 9 | Example 10 | Example 11 | Example 12 | Example 13 |
|---|---|---|---|---|---|---|---|---|---|
| Integrally molded body | Substrate for reinforcement | Type | [—] | Substrate for reinforcement 1 | Substrate for reinforcement 2 | Substrate for reinforcement 3 | Substrate for reinforcement 4 | Substrate for reinforcement 5 | Substrate for reinforcement 7 |
|  |  | Width | [mm] | 15 | 15 | 15 | 15 | 15 | 15 |
|  | Resin for injection molding | Type | [—] | Resin for injection molding 1 | Resin for injection molding 1 | Resin for injection molding 1 | Resin for injection molding 2 | Resin for injection molding 3 | Resin for injection molding 1 |
|  | Features | Bonding strength | [—] | A | A | B | A | A | A |
|  |  | Thickness variation | [—] | A | A | A | A | A | A |
|  |  | Moldability | [—] | A | A | B | A | A | A |
|  |  | Substrate area not in contact with mold when substrate for reinforcement was laid up in mold | [—] | B | B | B | A | B | B |
|  |  | Difference in fiber orientation angle | [—] | A | A | A | A | A | A |
|  | Properties | Flexural strength σc | [—] | A | A | A | A | A | A |
|  |  | Flexural modulus Ec | [—] | A | A | B | A | A | A |

TABLE 3-2

|  |  |  |  | Example 14 | Comparative Example 6 | Comparative Example 7 | Example 15 | Example 16 | Example 17 | Comparative Example 8 |
|---|---|---|---|---|---|---|---|---|---|---|
| Integrally molded body | Substrate for reinforcement | Type | [—] | Substrate for reinforcement 6 | Substrate for reinforcement 8 | Substrate for reinforcement 9 | Substrate for reinforcement 11 | Substrate for reinforcement 11 | Substrate for reinforcement 1 | Substrate for reinforcement 8 |
|  |  | Width | [mm] | 15 | 15 | 15 | 30 | 15 | 30 | 15 |

TABLE 3-2-continued

|  |  |  | Example 14 | Comparative Example 6 | Comparative Example 7 | Example 15 | Example 16 | Example 17 | Comparative Example 8 |
|---|---|---|---|---|---|---|---|---|---|
| Resin for injection molding | Type | [—] | Resin for injection molding 1 | Resin for injection molding 1 | Resin for injection molding 1 | Resin for injection molding 1 | Resin for injection molding 1 | Resin for injection molding 1 | Resin for injection molding 1 |
| Features | Bonding strength | [—] | B | C | — | A | A | A | C |
|  | Thickness variation | [—] | C | C | — | B | B | A | C |
|  | Moldability | [—] | C | D | — | A | A | A | D |
|  | Substrate area not in contact with mold reinforcement was laid up in mold | [—] | B | C | A | A | A | B | D |
|  | Difference in fiber orientation angle | [—] | A | A | — | A | A | A | C |
| Properties | Flexural strength σc | [—] | B | D | — | A | A | A | D |
|  | Flexural modulus Ec | [—] | B | C | — | A | A | A | C |

TABLE 4

|  |  |  |  | Example 18 | Example 19 | Comparative Example 9 | Example 10 |
|---|---|---|---|---|---|---|---|
| Integrally molded body | Substrate for | Type | [—] | Substrate for reinforcement 1 | Substrate for reinforcement 1 | Substrate for reinforcement 8 | Substrate for reinforcement 5 |
|  |  | Width | [mm] | 30 | 30 | 30 | 30 |
|  | Resin for injection molding | Type | [—] | Resin for injection molding 1 | Resin for injection molding 1 | Resin for injection molding 1 | Resin for injection molding 1 |
| Features |  | Bonding strength | [—] | A | A | C | C |
|  |  | Thickness variation | [—] | A | A | C | C |
|  |  | Moldability | [—] | A | A | D | D |
|  |  | Substrate area not in contact with injection molding body when substrate for reinforcement was laid up on injection molding body | [—] | A | B | C | D |
|  |  | Difference in fiber orientation angle | [—] | A | A | C | C |
| Properties |  | Flexural strength σc | [—] | A | A | A | A |
|  |  | Flexural modulus Ec | [—] | A | A | B | A |

As shown in Examples 1 to 13, by using a substrate for reinforcement having a difference in the orientation angle of the discontinuous fiber (a1) in each of regions obtained by dividing a major axis direction of the substrate for reinforcement (a) into 10 equal parts of within 10° each other, as the substrate for reinforcement (a), an integrally molded body having excellent bonding strength, in which the weldline was sufficiently reinforced, was prepared without occurring large thickness variation in the substrate for reinforcement. Among them, when using a substrate for reinforcement that had excellent strength, elastic modulus and linear expansion coefficient, which were isotropic, the substrate for reinforcement was unlikely to twist or be buried in the resin for injection molding, and accurately integrated with injection molding body. In particular, when a substrate for reinforcement having more excellent flexural modulus and linear expansion coefficient was used, an integrally molded body in which the substrate for reinforcement and the injection molding body were accurately integrated and the weldline was sufficiently reinforced was prepared without the substrate for reinforcement being disturbed or buried in the resin for injection molding even the substrate for reinforcement was made small. From the viewpoint of cost reduction and weight reduction, it is considered preferable to reduce the amount of the substrate for reinforcement.

On the other hand, Comparative Example 1 and Comparative Example 2 that did not use a substrate for reinforcement had significantly low weldline strength and elastic modulus. Further, Comparative Example 3 and Comparative Example 6 reinforced with a substrate of continuous fibers arranged in one direction had very low strength and elastic modulus in the direction perpendicular to the fiber direction, and the substrate for reinforcement was swept away by the flow of the resin for injection molding and the substrate for reinforcement twisted, or the substrate for reinforcement having anisotropy in the linear expansion coefficient floated during the integration and was buried in the injection molding body, or the position of the substrate for reinforcement was shifted. In addition, due to the influence, thickness variation of the substrate for reinforcement occurred, and the bonding strength deteriorated. As a result, the reinforcement to the weldline was insufficient, and the strength and elastic modulus were not improved. Also, as shown in Comparative Examples 4, 5 and Comparative Example 7, the rigidity of the substrate for reinforcement was obtained when using a thick substrate for reinforcement, but it was difficult to fill the resin for injection molding, and it was shown to be difficult to prepare an integrally molded body.

As shown in Example 15 and Example 16, even the substrate for reinforcement made of discontinuous fibers was pre-shaped, then inserted into the mold and used, the substrate for reinforcement was accurately integrated with the injection molding body without being twisted or buried in the resin for injection molding when integrating the substrate for reinforcement and the injection molding body, and an integrally molded body in which the weldline part was sufficiently reinforced was prepared. In Comparative Example 3 and Comparative Example 5 reinforced with a substrate of continuous fibers arranged in one direction, the area of the substrate not in contact with the mold which occurred when laid up in the mold was increased more in pre-shaped Comparative Example 5, and it became more difficult to use as the substrate for reinforcement.

As shown in Example 17, the substrate for reinforcement made of discontinuous fibers was excellent in shaping, and was inserted into a complicated shape part of the injection molding mold without being twisted. The obtained integrally molded body also had good quality and small thickness variation, and an integrally molded body with a sufficiently strengthened weldline part was prepared. On the other hand, as in Comparative Example 8, the substrate for reinforcement made of continuous fibers was insufficiently shaped into the complicated shape part of the injection molding mold. Also, the substrate for reinforcement was twisted during lay-up, and the substrate for reinforcement was buried and reinforcement of the weldline was insufficient in the obtained integrally molded body.

Then, as in Examples 18 and 19, when using, as the substrate for reinforcement (a), a substrate for reinforcement having a difference in the orientation angle of the discontinuous fiber (a1) in each of regions obtained by dividing a major axis direction of the substrate for reinforcement (a) into 10 equal parts of within 10° each other, even the substrate for reinforcement was arranged and integrated along the weldline of the injection molding body after the injection molding, an integrally molded body having excellent bonding strength, in which the weldline was sufficiently reinforced, was prepared without occurring large thickness variation. Further, the fibers containing the discontinuous fibers were excellent in shaping properties and could be integrated even in the R part of the injection molding body.

On the other hand, as in Comparative Examples 9 and 10, when using a continuous fiber substrate, the linear expansion coefficient had anisotropy, so that the substrate for reinforcement was twisted during heating of the substrate, and it was difficult to lay up the substrate for reinforcement along the weldline of the injection molding body; as a result, the bonding strength and the reinforcing effect on the weldline were low. Furthermore, the substrate for reinforcement made of unidirectional continuous fibers had low shaping properties and could not be integrated in the R part of the injection molding body.

The integrally molded body of the present invention can solve reduction in strength and rigidity at a weldline, which is a problem of an injection molding body. In particular, when using a substrate for reinforcement having a difference in the orientation angle of the discontinuous fiber (a1) in each of regions obtained by dividing a major axis direction of the substrate for reinforcement (a) into 10 equal parts of within 10°, it is possible to reinforce the weldline while preventing fiber disturbance of the substrate for reinforcement even though the substrate for reinforcement is made small and thin. Therefore, free design such as thin wall molding or complex shape molding is possible, and it can be applied to injection molding bodies in a wide range of industrial fields such as electrical and electronic equipment, robots, two-wheeled vehicles, automobiles, aircraft members, and parts and casings.

DESCRIPTION OF REFERENCE SIGNS

1: Insert area S0 of substrate for reinforcement
2: Area S1 of substrate for reinforcement after integration existing in insert area S0 of substrate for reinforcement
3: Substrate for reinforcement
4: Injection molding body
5: Weldline
6: Test piece cut area
7a, 7b: Measuring jig
8: Rib
9: Boss
10: Test piece

The invention claimed is:

1. An integrally molded body in which a substrate for reinforcement (a) having a discontinuous fiber (a1) and a resin (a2) and an injection molding body (b) having a discontinuous fiber (b1) and a resin (b2) are integrated,
   the substrate for reinforcement (a) having a difference in an orientation angle of the discontinuous fiber (a1) in each of regions obtained by dividing a major axis direction of the substrate for reinforcement (a) into 10 equal parts of within 10°,
   the substrate for reinforcement (a) covering a part or all of a weldline of the injection molding body (b) to be integrated with the injection molding body (b),
   wherein the substrate for reinforcement (a) has a thickness of 0.03 mm or more and 0.25 mm or less, and
   wherein the substrate for reinforcement (a) is 5% or more and 30% or less with respect to projected area of the integrally molded body.

2. The integrally molded body according to claim 1, wherein a bonding strength between the substrate for reinforcement (a) and the injection molding body (b) is 7 MPa or more, and
   a thickness variation of the substrate for reinforcement (a) in the integrally molded body is within 10%.

3. An integrally molded body in which a substrate for reinforcement (a) having a discontinuous fiber (a1) and a resin (a2) and an injection molding body (b) having a discontinuous fiber (b1) and a resin (b2) are integrated,
   a bonding strength between the substrate for reinforcement (a) and the injection molding body (b) being 7 MPa or more,
   a thickness variation of the substrate for reinforcement (a) in the integrally molded body being within 10%,
   the substrate for reinforcement (a) covering a part or all of a weldline of the injection molding body (b) to be integrated with the injection molding body (b),
   wherein the substrate for reinforcement (a) has a thickness of 0.03 mm or more and 0.25 mm or less, and
   wherein the substrate for reinforcement (a) is 5% or more and 30% or less with respect to projected area of the integrally molded body.

4. The integrally molded body according to claim 1, wherein the substrate for reinforcement (a) is substantially isotropic.

5. The integrally molded body according to claim 1, wherein the substrate for reinforcement (a) has a linear expansion coefficient of $7\times10^{-6}$/K or less.

6. The integrally molded body according to claim 1, wherein the substrate for reinforcement (a) has a flexural modulus of 10 GPa or more.

7. The integrally molded body according to claim 1, wherein the substrate for reinforcement (a) is in the form of a tape.

8. A method for producing an integrally molded body comprising arranging a substrate for reinforcement (a) having a discontinuous fiber (a1) and a resin (a2) in a mold and integrating the substrate for reinforcement (a) with a weldline of an injection molding body (b) having a discontinuous fiber (b1) and a resin (b2), the substrate for reinforcement (a) having a difference in an orientation angle of the discontinuous fiber (a1) in each of regions obtained by dividing a length direction of the substrate for reinforcement (a) when arranged in the mold into 10 equal parts of within 10°, wherein the substrate for reinforcement (a) has a thickness of 0.03 mm or more and 0.25 mm or less, and wherein the substrate for reinforcement (a) is 5% or more and 30% or less with respect to projected area of the integrally molded body.

9. The method for producing an integrally molded body according to claim 8, wherein, when arranging the substrate for reinforcement (a) in the mold, a ratio of the area of the substrate for reinforcement not in contact with the mold is 5% or less.

10. The method for producing an integrally molded body according to claim 8, comprising pre-shaping the substrate for reinforcement (a) and then inserting it into the mold for molding.

11. A method for producing an integrally molded body comprising integrating a substrate for reinforcement (a) having a discontinuous fiber (a1) and a resin (a2) with a weldline of an injection molding body (b) having a discontinuous fiber (b1) and a resin (b2), the substrate for reinforcement (a) having a difference in an orientation angle of the discontinuous fiber (a1) in each of regions obtained by dividing a length direction of the substrate for reinforcement (a) when laying up the substrate for reinforcement (a) on the injection molding body (b) into 10 equal parts of within 10°, wherein the substrate for reinforcement (a) has a thickness of 0.03 mm or more and 0.25 mm or less, and wherein the substrate for reinforcement (a) is 5% or more and 30% or less with respect to projected area of the integrally molded body.

12. The method for producing an integrally molded body according to claim 11, wherein, when the substrate for reinforcement (a) is laid up on the injection molding body (b), a ratio of the area of the substrate for reinforcement not in contact with the injection molding body (b) is 5% or less.

13. The method for producing an integrally molded body according to claim 8, wherein the substrate for reinforcement (a) is substantially isotropic.

14. The method for producing an integrally molded body according to claim 8, wherein the substrate for reinforcement (a) has a linear expansion coefficient of $7\times10^{-6}$/K or less.

15. The method for producing an integrally molded body according to claim 8, wherein the substrate for reinforcement (a) has a flexural modulus of 10 GPa or more.

16. The method for producing an integrally molded body according to claim 8, wherein the substrate for reinforcement (a) is in the form of a tape.

* * * * *